US007698007B2

(12) United States Patent
Takemura

(10) Patent No.: US 7,698,007 B2
(45) Date of Patent: Apr. 13, 2010

(54) EDITING APPARATUS OF SCENE DATA FOR DIGITAL MIXER

(75) Inventor: Satoshi Takemura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1352 days.

(21) Appl. No.: 11/067,158

(22) Filed: Feb. 25, 2005

(65) Prior Publication Data

US 2005/0192688 A1 Sep. 1, 2005

(30) Foreign Application Priority Data

Feb. 27, 2004 (JP) ............................ 2004-053866
Feb. 27, 2004 (JP) ............................ 2004-053867

(51) Int. Cl.
*G06F 17/00* (2006.01)

(52) U.S. Cl. ......................... 700/94; 381/119; 715/716

(58) Field of Classification Search .................... 700/94
See application file for complete search history.

(56) References Cited

U.S. PATENT DOCUMENTS

| | | | | |
|---|---|---|---|---|
| 6,057,829 | A * | 5/2000 | Silfvast | 345/156 |
| H1882 | H * | 10/2000 | Asthana et al. | 370/503 |
| 6,327,631 | B1 * | 12/2001 | Eastty et al. | 713/375 |
| 7,164,435 | B2 * | 1/2007 | Wang et al. | 348/14.08 |
| 7,165,005 | B2 * | 1/2007 | Steger et al. | 702/120 |
| 7,433,745 | B2 * | 10/2008 | Aoki et al. | 700/94 |
| 7,489,978 | B2 * | 2/2009 | Suyama et al. | 700/94 |
| 2002/0038308 | A1 * | 3/2002 | Cappi | 707/104.1 |
| 2002/0082732 | A1 * | 6/2002 | Suyama et al. | 700/94 |
| 2003/0212466 | A1 * | 11/2003 | Alferness | 700/94 |
| 2004/0133291 | A1 * | 7/2004 | Nakayama et al. | 700/94 |

OTHER PUBLICATIONS

"Owner's Manual for Digital Mixing Engine DME 32" by Yamaha Corporation, 2001.

* cited by examiner

*Primary Examiner*—Curtis Kuntz
*Assistant Examiner*—Paul McCord
(74) *Attorney, Agent, or Firm*—Morrison & Foerster LLP

(57) ABSTRACT

A digital mixer has a processor capable of executing a program to constitute an audio signal processing unit corresponding to various mixer configurations. Configuration ID is attached to each mixer configuration, and the same configuration ID is attached to the mixer configurations having compatibility between their scene data which is a data set of parameters for use in operation of the audio signal processing unit. When a mixer configuration is edited, the same configuration ID as that of the mixer configuration before editing is attached to the mixer configuration after editing. Under the condition that there is a match between the configuration ID of read source and the configuration ID of write destination, the scene data accompanying each mixer configuration is written from the mixer configuration of read source to the mixer configuration of write destination.

27 Claims, 12 Drawing Sheets

CONFIGURATION DATA IN RAM

CURRENT MEMORY

SCENE STORE FROM CURRENT TO CF FILE

EDITING APPARATUS OF SCENE DATA FOR DIGITAL MIXER

BACKGROUND OF THE INVENTION

1. Technical Field

The present invention generally relates to a digital mixer for processing audio signals, and specifically relates to an editing apparatus for editing scene data and mixer configuration data applied to the digital mixer, and a scene data storage apparatus.

2. Related Art

Digital mixers are known in which a mixer configuration can be customized as described in non-patent document "DIGITAL MIXING ENGINE DME32 INSTRUCTION MANUAL", Yamaha Corp., 2001. In the described technology, an audio signal processing unit is configured by use of a processor (for example, a digital signal processor (DSP)) that operates in accordance with programs to process audio signals on the basis of a mixer configuration (or signal processing configuration), which can be edited by use of an external PC (Personal Computer). The creation and editing of the mixer configuration on the PC are executed by use of a dedicated mixer control program. Namely, components of the mixer configuration displayed on the screen of the PC are arranged and these components are interconnected to specify their input/output relationship, thereby creating and editing the mixer configuration. The created mixer configuration is transferred to the digital mixer machine, which executes the received mixer configuration to realize the operation of the digital mixer.

The above-mentioned related-art mixer allows the use of a plurality of scene data for different mixer configurations. Scene data denotes a data set of parameters which are used when operating the digital mixer with the specific mixer configuration. If a same mixer configuration is used, the user sometimes wants to operate the digital mixer with different parameters for different scenes, so that a plurality of scene data are prepared, which may be called from time to time to operate the digital mixer.

Scene data accompanies each mixer configuration, so that different mixer configurations require different scene data structures. Therefore, there is no compatibility between the scene data having different structures corresponding to different mixer configurations. This lack of compatibility presents problems in various stages. For example, there sometimes occurs a situation in which a mixer configuration currently being executed with a mixer engine is slightly edited by the mixer control program of a PC and the edited mixer configuration is transferred from the mixer control program to the mixer engine for operation. However, this presents a problem that the scene used with the mixer configuration before editing cannot be recalled by the edited mixer configuration. Another problem is that, if a mixer engine comes with two or more models, they generally require different scene data structures, thereby making it impossible to share scenes among different models no matter similar the mixer structures are to each other.

Practically, one mixer configuration includes a plurality of configuration components such as an equalizer, a compressor, a filter, a mixer, and an effecter, and different mixer configurations may include configuration components of similar types. It is sometimes desired to share scene data between these configuration components. However, the sharing of scene data between different configuration components is allowed only for those mixer configurations designed accordingly. Consequently, the other mixer configurations cannot share scene data for reasons of the difference in configuration component scale for example.

SUMMARY OF THE INVENTION

It is therefore a first object of the present invention to provide, under predetermined conditions, compatibility between the scene data having different structures corresponding to different mixer configurations in a digital mixer with its audio signal processing unit configured by a processor operational in accordance with programs, the digital mixer being able to process audio signals on the basis of a mixer configuration edited by use of an external PC.

It is therefore a second object of the present invention to provide a digital mixer with its audio signal processing unit constituted by a processor capable of operating in accordance with a program, the digital mixer being capable of processing audio signals on the basis of a given mixer configuration, wherein regardless of the difference between mixer configurations, scene data compatibility is provided between the configuration components of each mixer configuration under a predetermined condition.

In order to achieve the above-mentioned first object, configuration identification information (configuration ID) is attached to each mixer configuration, and the same configuration ID is attached to the mixer configurations having compatibility between their scene data. For example, when a mixer configuration is edited, the same configuration ID as that of the mixer configuration before editing is attached to the mixer configuration after editing. Under the condition that there is a match between the configuration ID of read source and the configuration ID of write destination, the scene data accompanying each mixer configuration is written from the mixer configuration of read source to the mixer configuration of write destination. In addition, unique identification code (unique ID) is attached to each component of the mixer configuration. The mixer configurations having the same configuration ID, even though these mixer configurations differ from each other in structure, can transfer scene data between them on the basis of this unique ID. Each mixer configuration may be stored as a data file or developed in RAM.

In order to achieve the above-mentioned second object, a storage section is arranged for storing scene data including a plurality of component scenes for use in operation of the plurality of components of the mixer configuration, the scene data being a data set of parameters for use in the audio signal processing of the mixer configuration. If a match is found between the component identification information (component ID) of a component scene specified as copy source and the component ID of a component scene specified as copy destination, a copy operation is executed from the component scene of copy source to the component scene of copy destination. The components identified by the same component ID have data compatibility between their component scenes. Between the component scene of copy source and the component scene of copy destination, only common elements common to both of the component scene of copy source and the component scene of copy destination are copied.

In a main aspect of the invention, a scene data editing apparatus is designed for use with a digital mixer having a processor capable of executing a program to constitute an audio signal processing unit, the apparatus being provided for editing scene data which is a data set of parameters for use in operation of the audio signal processing unit. The inventive scene data editing apparatus comprises a first storage section that stores first scene data which is a data set of parameters for use in the operation of the audio signal processing unit having a first mixer configuration specified by first configuration identification information and first version information, an editing section that edits contents of the first scene data stored in the first storage section, a second storage section that stores second scene data which is a data set of parameters for use in the operation of the audio signal processing unit having a second mixer configuration specified by second configuration identification information and second version information, and a copy section that can perform copying of the second scene data to the first scene data provided that a match is found between the first configuration identification information and the second configuration identification information even if the first version information and the second version information are different, by reading the second scene data from the second storage section and writing at least a part of the read second scene data which corresponds to a portion common to both of the first mixer configuration and the second mixer configuration into the first storage section.

Preferably, the first mixer configuration specified by the first configuration identification information and the first version information is composed of configuration components identified by respective unique identification codes, and the second mixer configuration specified by the second configuration identification information and the second version information is composed of configuration components identified by respective unique identification codes, and the copy section determines the portion common to both of the first mixer configuration and the second mixer configuration according to the unique identification codes allotted to the configuration components common to both of the first mixer configuration and the second mixer configuration.

In another aspect of the invention, a mixer configuration editing apparatus is designed for use with a digital mixer having a processor capable of executing a program to constitute an audio signal processing unit having a specific mixer configuration composed of configuration components, the apparatus being designed for editing mixer configuration data which defines the mixer configuration of the audio signal processing unit. The inventive mixer configuration editing apparatus comprises a mixer configuration data storage section that stores the mixer configuration data specified by configuration identification information and version information, an editing section that reads the mixer configuration data specified by the configuration identification information and the version information from the mixer configuration data storage section, then edits the read mixer configuration data, and writes the edited mixer configuration data to the mixer configuration data storage section with the same configuration identification information and updated version information, and a transfer section that manipulates the mixer configuration data as required and transfers the manipulated mixer configuration data to the digital mixer. The editing section includes an adding subsection that is operated as directed by a user to add a new configuration component to the mixer configuration and to allocate a unique identification code to the new configuration component such that the unique identification code adheres to the added new configuration component even after the version information is updated due to the editing of the mixer configuration data, a deleting subsection that is operated as directed by the user for deleting an existing configuration component from the mixer configuration, and a connecting subsection that is operated as directed by the user for setting connections among the configuration components included in the mixer configuration.

Preferably, the adding subsection allocates a new unique identification code to the new configuration component, such that the new unique identification code is selected from a code which has never been used in the mixer configuration data specified by the same configuration identification information, and the deleting subsection abolishes the unique identification code allocated to the deleted existing configuration component such that the abolished unique identification code is never used for a new configuration component in the mixer configuration data specified by the same configuration identification information. Further, the editing section includes a changing subsection that is operated as directed by the user for changing at least one of the configuration components included in the mixer configuration to a configuration component of the same type but a different scale as said one of the configuration components while maintaining the unique identification code allocated to said one of the configuration components.

In a further aspect of the invention, a scene data editing apparatus is designed for use in a digital mixer having a processor capable of executing a program to constitute an audio signal processing unit having a mixer configuration specified by configuration identification information and version information, the apparatus being provided for editing scene data which is a parameter set for use in operation of the audio signal processing unit. The inventive scene data editing apparatus comprises a mixer configuration data storage section that stores a plurality of mixer configuration data including first mixer configuration data defining a first mixer configuration specified by first configuration identification information and first version information, and second mixer configuration data defining a second mixer configuration specified by second configuration identification information and second version information, a first scene data storage section that stores first scene data which is a parameter set of the first mixer configuration specified by the first configuration identification information and the first version information for use in operation of the audio signal processing unit of the first mixer configuration, a first access section that specifies an arrangement of data elements of each parameter of the first scene data based on the first mixer configuration and that is operated to access the first scene data storage section for reading and writing of the first scene data, a parameter editing section that reads the first scene data stored in the first scene data storage section by use of the first access section for editing contents of the first scene data, a second scene data storage section that stores second scene data which is a parameter set for use in the second mixer configuration specified by the second configuration identification information and the second version information, a second access section that specifies an arrangement of data elements of each parameter of the second scene data based on the second mixer configuration and that is operated to access the second scene data storage section for reading and writing of the second scene data, and a copy section that performs copying of each parameter between the first scene data stored in the first scene data storage section and the second scene data stored in the second scene data storage section by use of the first access section and the second access section if a match is found between the first configuration identification information and the second configuration identification information, such that the copying is effected only a portion of the data elements of each parameter overlapped between the first scene data and the second scene data.

In another major aspect of the invention, a parameter editing apparatus is designed for use in a digital mixer having a processor capable of executing a program to constitute an audio signal processing unit composed of a plurality of components, the apparatus being provided for editing a component scene which is a parameter set for use in operation of each component of the audio signal processing unit. The inventive parameter editing apparatus comprises a first storage section that stores a first component scene which is a parameter set for use in operation of a first component identified by first component identification information and first property information, the first component scene having a first data arrangement according to the first property information of the first component, an editing section that edits contents of the first component scene stored in the first storage section, a second storage section that stores a second component scene which is a parameter set for use in operation of a second component identified by second component identification information and second property information, the second component scene having a second data arrangement according to the second property information of the second component, and a copy section that reads the second component scene from the second storage section if a match is found between the second component identification information corresponding to the second component scene and the first component identification information corresponding to the first component scene, and that writes at least a part of the data arrangement of the read second component scene which is common to the data arrangement of the first component scene into the first storage section.

According to the invention, a match between the configuration IDs between different mixer configurations indicates the compatibility between scene data, thereby making it practicable to transfer (recall, store, and copy) the scene data. Consequently, the scenes created with a mixer configuration before editing can also be used with a new mixer configuration obtained by editing the mixer configuration. Conversely, the scenes created with the edited mixer configuration can be used with the unedited mixer configuration.

Further according to the invention, if a match is found between the configuration component IDs of the two configuration components in one mixer configuration or two mixer configurations, it indicates that there is compatibility between the component scenes corresponding to these configuration components, so that these component scenes can be transferred (recalled, stored, and copied). Therefore, when a mixer configuration is edited, a component scene corresponding to one configuration component of the mixer configuration before being edited can be used for a configuration component corresponding to the edited new mixer configuration. In this case, the component scene is usable even if the scale of the configuration component changes after the editing. Conversely, a component scene created by the new mixer configuration can also be used by the mixer configuration before being edited.

DETAILED DESCRIPTION OF THE INVENTION

The following describes embodiments of the invention with reference to drawings accompanying hereto.

Figure 1:
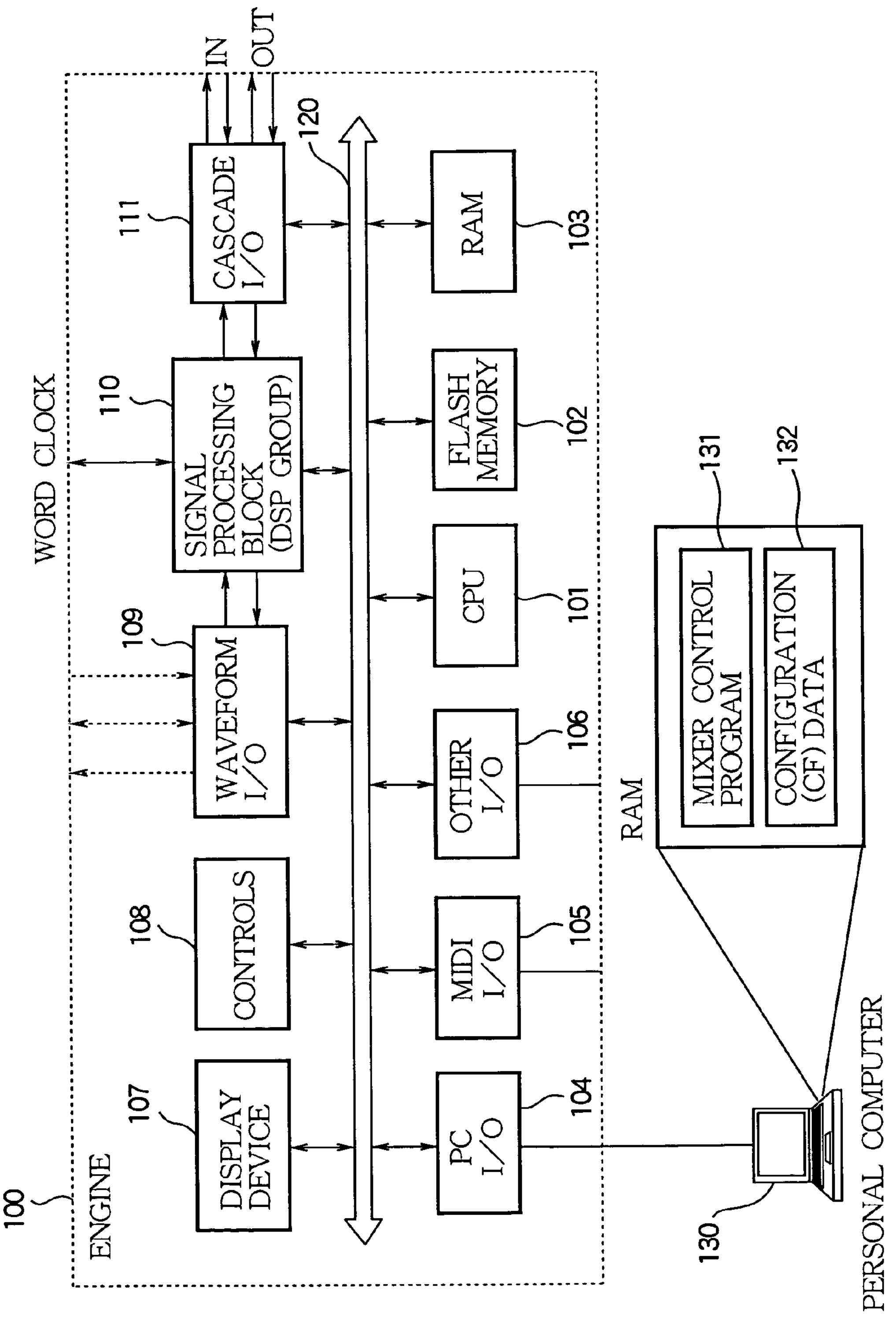
FIG. 1 is a block diagram illustrating an engine of a digital mixer practiced as one embodiment of the invention.

Referring to FIG. 1, there is shown a schematic diagram illustrating an exemplary configuration of a digital mixer engine practiced as one embodiment of the invention. An engine 100 has a central processing unit (CPU) 101, a flash memory 102, a RAM (Random Access Memory) 103, a PC input/output interface (I/O) 104, a MIDI I/O 105, another I/Os 106, an display device 107, a control 108, a waveform I/O 109, a signal processing block (DSP group) 110, a cascade I/O 111, and a system bus 120.

The central processing unit (CPU) 101 controls the entire operation of this mixer. The flash memory 102 is a non-volatile memory storing various programs and data that are used by the CPU 101 and DSPs of the signal processing block 110. The RAM 103 is a volatile memory that provides a load area and a work area for the programs to be executed by the CPU 101. The PC I/O 104 is an interface (for example, LAN, USB or serial I/O) for connecting the mixer to an external personal computer (hereafter referred to as a PC). The MIDI I/O 105 provides an interface for connecting various MIDI devices. Another I/O 106 provides an interface for connecting another device. The display device 107 is a display device arranged on an external panel of this mixer for displaying various kinds of information. The control 108 includes various controls arranged on the external panel for the user to operate. The waveform I/O 109, providing an interface for transferring audio signals with external devices, realizes an A/D (Analog-to-Digital) conversion function for converting an inputted analog audio signal into a digital audio signal and passing it to the signal processing block 110, a digital signal input function for inputting a digital audio signal and passing it to the signal processing block 110, and a D/A (Digital-to-Analog) conversion function for converting a digital audio signal outputted from the signal processing block 110 into an analog audio signal, for example. The signal processing block 110 is made up of several DSP (Digital Signal Processors). Each DSP executes various microprograms as directed by the CPU 101 to mix, waveform signals inputted via the waveform I/O 109, imparts effects to them, and control their volume levels, outputting the processed waveform signals via the waveform I/O 109. The cascade I/O 111 provides an interface for connecting to other digital mixers in a cascaded manner. The cascade connection can increase the number of input/output channels and the DSP performance.

The engine 100 allows the user to customize each mixer configuration to be realized in the signal processing block 110. The mixer configuration can be created and edited on the screen of a PC 130 by use of a predetermined mixer control program 131. Namely, mixer control program 131 is a kind of application software instructions executable by the PC 130 for editing the mixer configuration. Further, the mixer control program 131 may be used to edit scene data which is a parameter set for use in operation of the mixer. The created mixer configuration is referred to as a configuration (the entity on the PC is CD data). In response to user commands entered through the screen, the mixer control program 131 generates each configuration as configuration data (CF) 132. The CF data 132 can be stored from the RAM 103 into a given writable storage device as a file. The CD data in the memory or the storage device of the PC 130 can be transferred to the engine 100 (after compilation (to be described later)). The engine 100 can store the CF data received from the PC 130 into the flash memory 102. A predetermined operation can read the CF data from the flash memory 102 into a current memory (to be described later) in the RAM 103 or directly develop the CF data received from the PC 130 into a current memory to operate the engine 100 on the basis of the CD data in the current memory, thereby realizing the mixer having a mixer configuration defined in the CD data.

It should be noted that the user who wants to create and edit CD data by means of the PC 130 is not limited to end users; namely, business users can also create and edit CD data. For example, if a mixer is installed in some venue, its vendor goes to the venue, connects the PC 130 to the mixer, creates and edits the CF data having a mixer configuration made suitable for the venue, and stores the resultant CF data into the flash memory 102. In this case, the mixer may be non-programmable (namely, the end user is not allowed to create and edit his own mixer configuration, only calling and using the vendor-made mixer configuration). Because the end user can read the CF data from the flash memory 102 by operating the control 108 on the panel and operate the mixer having the mixer configuration defined in the CF data, the user need not connect the PC 130 to the mixer at the time of operation. Obviously, it is also practicable for the end user to connect the PC 130 to the mixer and control the mixer by means of the connected PC 130.

Figure 2:
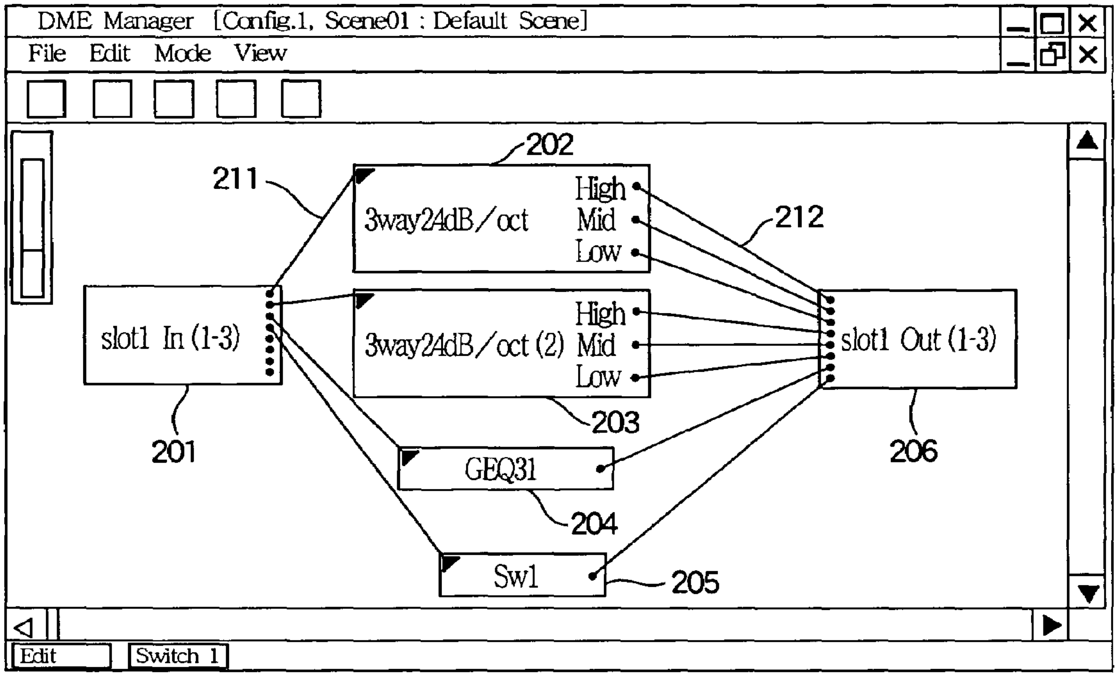
FIGS. 2(*a*) and 2(*b*) are a diagram illustrating examples of a configuration screen and a parameter setting screen, respectively.
Figure 2:
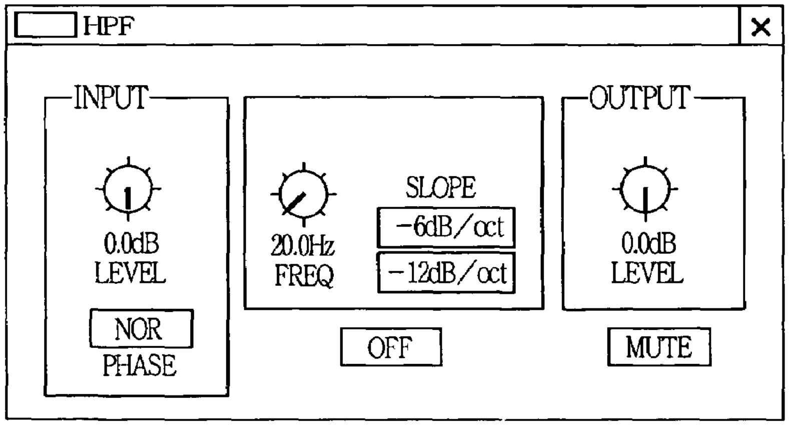

FIG. 2(*a*) shows an exemplary screen (called a configuration screen) that is displayed when the CF data 132 is created and edited on the PC 130 by the mixer control program 131. Reference numeral 201 denotes an input component, reference numerals 202 and 203 denote 3-way cross-over (namely, a function for dividing an input signal into three frequency channels of high, medium, and low) components, reference numeral 204 denotes a 31-band graphic equalizer component, reference numeral 25 denotes a 1-channel (ch) switch component, and reference numeral 206 denotes an output component. A component denotes a part block that constitute a configuration; for example, audio processors such as mixer, compressor, effecter, and cross-over and parts such as fader, switch, pan, and meter are prepared as preset components. The user can select any desired components from among a plurality of components by executing a predetermined operation and arrange the selected components on the screen. In addition, the user can arrange connections (for example, 211 and 212) between the terminals of components by executing a predetermined operation. The arrangement of connections is equivalent to the definition of the input/output relationship between signals transferred between components. The CF data 132 thus completed can be stored in a hard disk drive. Also, the CF data 132 can be transferred from the PC 130 to the engine 100 via the PC I/O 104 after being compiled (into the information that can be interpreted by the engine 100). As required, the CF data 132 may be read by the engine 100 by means of a detachable recording medium such as a memory card for example.

The mixer control program 131 has two operation modes; an edit mode and an execute mode. The two modes can be switched between by executing a predetermined processing. In the edit mode, CF data is created and edited. In the execute mode, the engine 100 is controlled realtime by the mixer control program 131 of the PC 130. For example, if a component having a fader is found in a mixer configuration displayed on the configuration screen, operating in the execute mode this fader by use of the mouse reflects this operation onto the engine 100 realtime. In the execute manner, the configuration of each component and the connection between components cannot be changed. The execute mode can be entered only when there is a match between a configuration called into the current memory on the side of the PC 130 and a configuration called into the current memory on the side of the engine 100.

FIG. 2(*b*) shows an exemplary parameter setting screen for a component. Double-clicking a desired component on the configuration screen shown in FIG. 2(*a*) opens the parameter setting screen for the selected component. On the displayed parameter setting screen, the user can set parameters (including values and on/off) for the component. Shown in FIG. 2(*b*) is an example of the parameter setting screen component HPF (High Pass Filter). Different components require different parameter items that can be set for the components, so that different parameter setting screens are prepared for different components. When parameter values are changed on a particular parameter setting screen, the change done will be reflected onto the engine 100 realtime in the execute mode; in the edit mode, the parameter change will result in offline-editing (only data in the PC 130 will be changed without affecting the engine 100). The current setting value of each parameter item is referred to as a current value. It is supposed that, when a new component is selected and arranged on the configuration screen, a default value be set as the current value of the selected component.

Figure 3A:
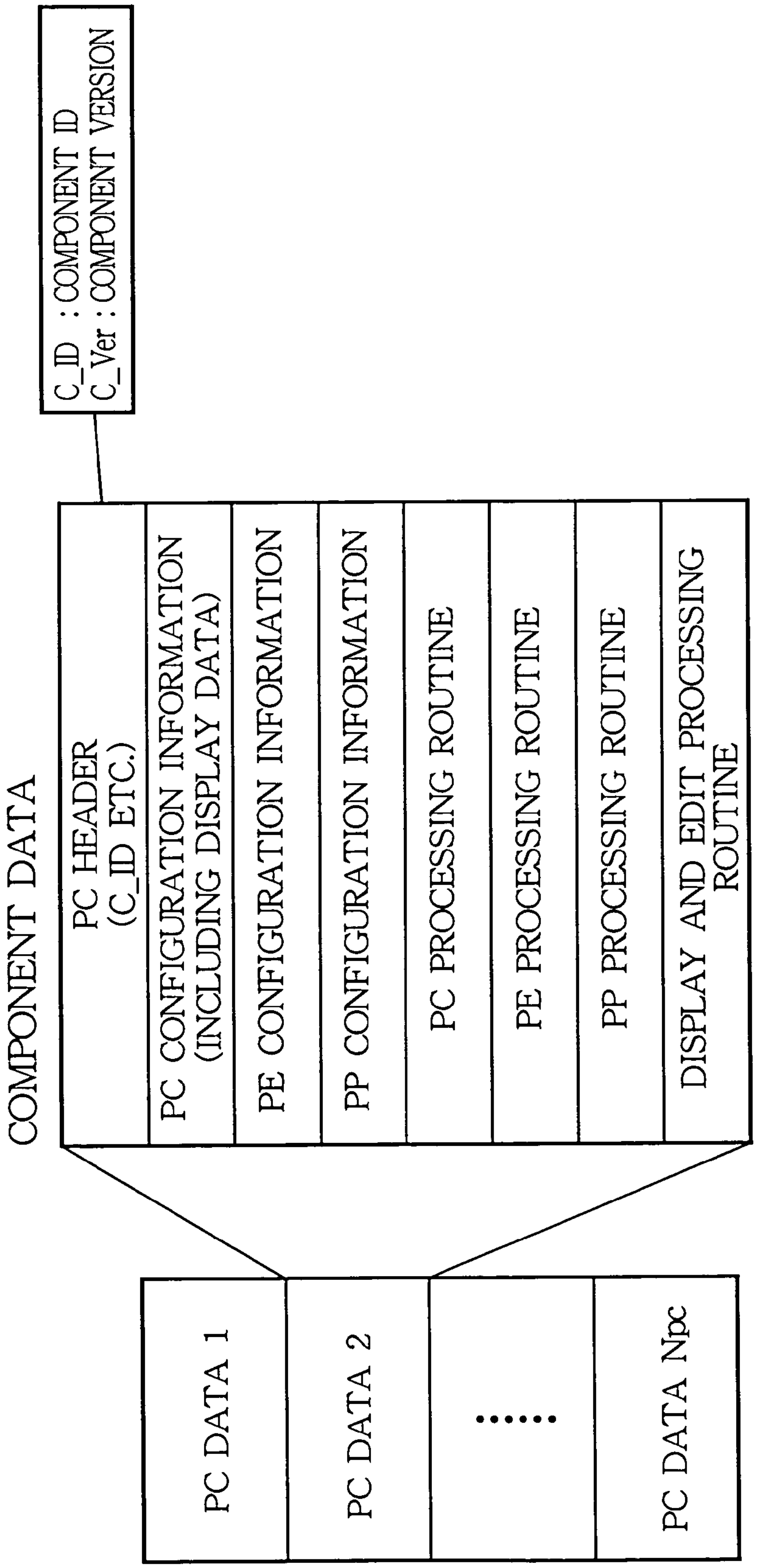
FIGS. 3(*a*), 3(*b*) and 3(*c*) are schematic diagrams illustrating configuration data (CF data) on a personal computer.
Figure 3:
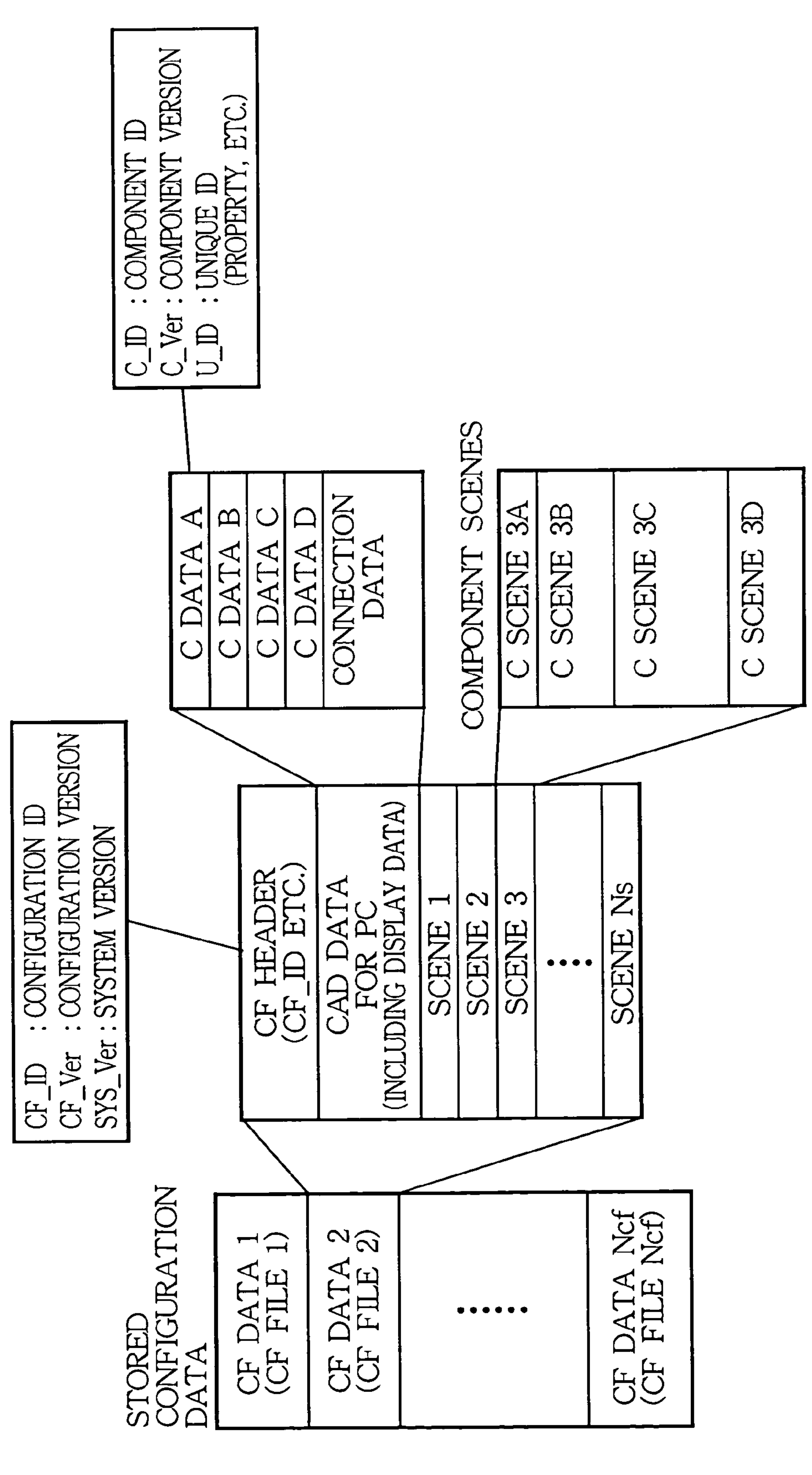
Figure 3:
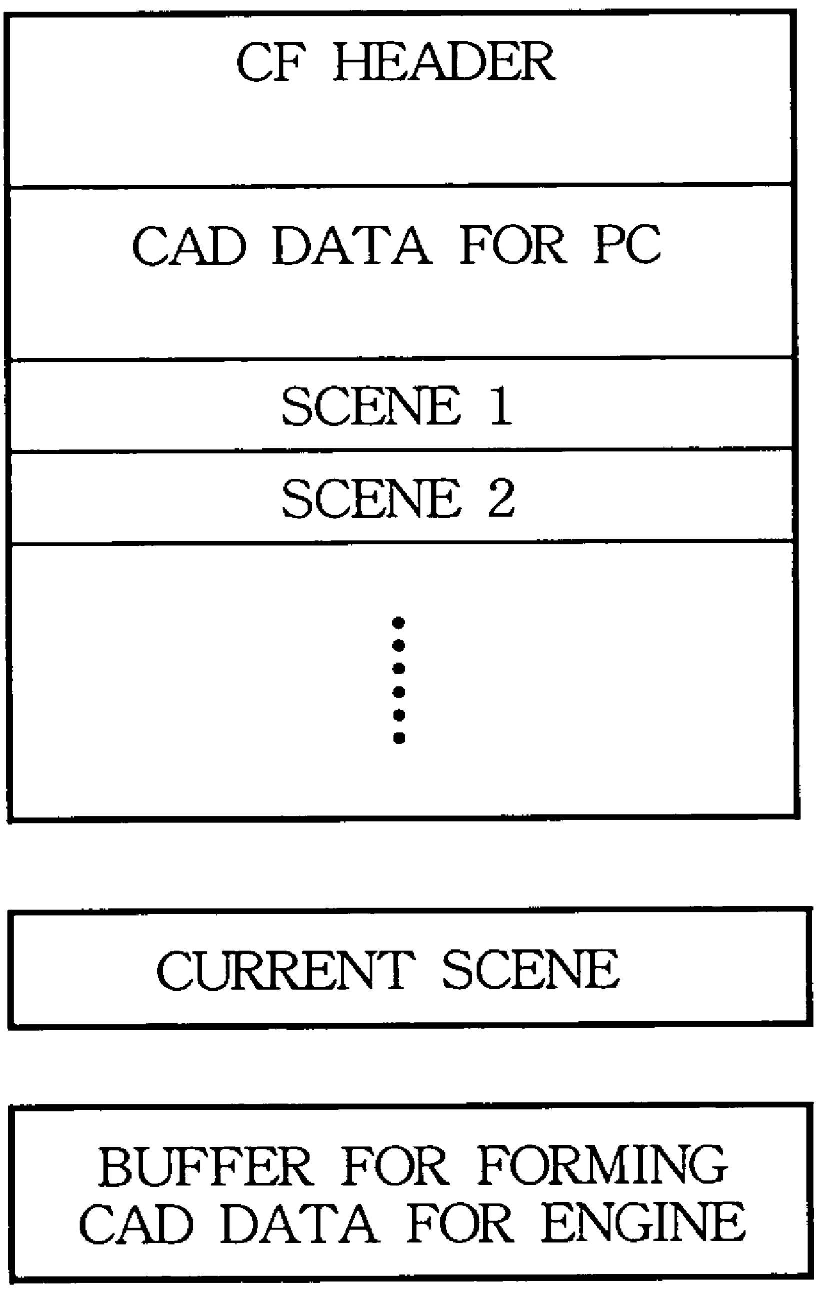

FIG. 3(*a*) shows an exemplary preset component data for use by the mixer control program 131 of the PC 130. This component data is stored beforehand in a given storage section accessible by the mixer control program 131. The component data is made up of PC (Preset Component) data for each type of component. In this example, it is supposed that there be Npc component types. Each PC data is made up of a PC header, PC configuration information, PE configuration information, PP configuration information, a PC processing routine, a PE processing routine, a PP processing routine, and a display and edit processing routine. The PC header is made up of component ID (C_ID) and component version (C_Ver). C_ID and C_Ver identify PC data.

PC configuration information is indicative of which element that component is made up of (including the information about the sequence of elements) and includes display data such as the parameter setting screen of that component. An element is equivalent to a part (for example, elements constituting the parameter setting screen) that constitutes a component. PE configuration information is indicative of parameter item configuration information (for example, indicative of which of data formats, single value, one-dimensional sequence, and two-dimensional sequence, the parameters of that element are arranged in) for each element shown in the above-mentioned PC configuration information. PP configuration information provides the information (for example, which of parameter formats, integer value and floating decimal, the parameter value is in) about the configuration of each parameter item shown in the above-mentioned PE configuration information. The PC processing routine is a program for executing various processing operations associated with PE configuration information and the PP processing routine is a program for executing various processing operations associated with PP configuration information. When the mixer control program 131 processes CF data, the PC processing routine, PE processing routine, and PP processing routine for each component are used. The display and edit processing routine is a group of programs for use in creating and editing CF data.

FIG. 3(*b*) shows an exemplary configuration of CF data created and stored by the mixer control program 131 in the PC 130. CF data 1 through Ncf each specify one mixer configuration. Each of CF data is stored in a given storage device (the hard disk unit in the PC, for example) as one file. In this example, CF data are arranged as CF file 1, CF file 2, and so on; however, each CF file is a unit that can be independently copied or moved in the file system on the PC 130. Term "CF file" is indicative of CF data that is stored in the hard disk drive for example. Term "CF data" is indicative of data for defining one mixer configuration composed of data having shown contents regardless of the form of storage.

As shown in FIG. 3(*b*), one piece of CF data is composed of a CF header, CAD data for PC, and Ns pieces of scene data. The CF header is composed of configuration ID (CF_ID), configuration version (CF_Ver), and system version (SYS_Ver). The CAD data for PC defines the type of components and the method of connecting them in the mixer configuration of that CF data, including the display data for displaying the configuration screen described with reference to FIG. 2(*a*). The CAD data for PC is composed of C (Component) data for identifying components to be used and connection data for interconnecting these components. In the figure, there are four pieces of C data, A through D, thereby indicating that the mixer configuration of this CD data is made up of four components. The C data is made up of component ID (C_ID), component version (C_Ver), unique ID (U_ID), and other data (property, for example).

The following describes scene data (each of scene 1, scene 2, . . . , scene Ns shown is scene data). A scene denotes a set of parameters (their values being set on the parameter setting screen described with reference to FIG. 2(*b*)) of all components constituting one configuration. The data structure of each scene is determined on the basis of the PC data (FIG. 3(*a*)) specified by C-ID and C-Ver of each C data of the CAD data for PC and the property of the C data. The scene data is data for defining one scene, namely a data set of specific parameter values for use when each component of that configuration operates. The scene data to be edited on each screen such as the parameter setting screen in the current memory on the side of the PC 130 is called current scene. Likewise, on the side of the engine 100, the scene data in use by the processing in the engine 100 currently in the current memory (in the engine 100) is called a current scene. With a same mixer configuration, it is sometimes required to change parameters in that mixer configuration in accordance with scenes, so that the scene data for a plurality of scenes can be included in the piece of CF data. Each scene is identified by scene number n and is called scene n; n=1, 2, . . . , Ns of scene 1, scene 2, . . . , scene Ns represent scene numbers. When storage of scene n is directed, the current scene is stored in the scene data storage area for the specified scene n; when recall from scene n is specified, the scene data read from the scene storage area of scene n is recalled (or written) to the current scene.

Scene data is formed a sequence of component scenes (hereafter referred to as C scenes) indicative of the parameter value of each component. This sequence corresponds to the sequence of the C data in the CAD data for PC. In the figure, the parameter of the component identified by C data A is C scene 3A, the parameter of the component identified by C data B is C scene 3B, and so on. The current scene stored in the current memory and the scene data of each scene have the above-mentioned data structures defined by the CAD data for PC.

Figure 4:
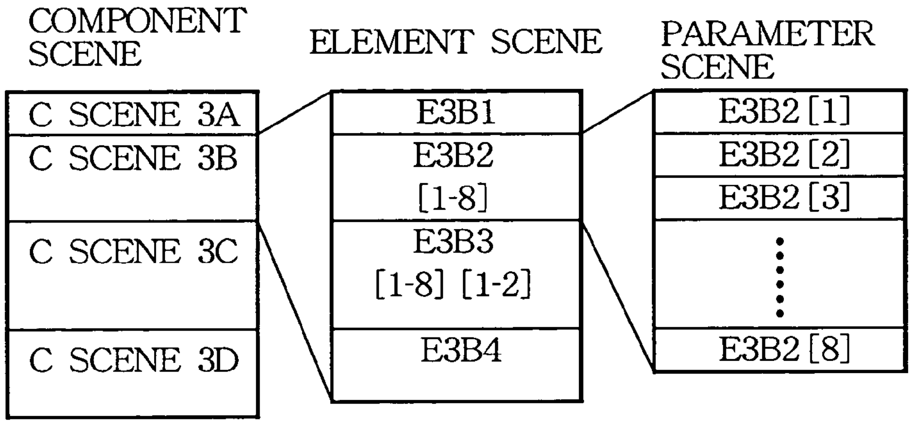
FIG. 4 is a detailed diagram illustrating scene data.

FIG. 4 shows a detail configuration of the scene data shown in FIG. 3. The component scenes shown in FIG. 4 correspond to those shown in FIG. 3(*b*). One C scene is made up of the parameter sequence (element scenes) to be set to each element constituting one component. The element scene sequence corresponds to the element sequence shown by the PC configuration information (FIG. 3(*a*)) of that component. For example, element scene E3B1 shown in FIG. 4 indicates the parameter of the first element constituting the component of C scene 3B. Because the component of C scene 3B is made up of four elements in this example, there are four element scenes. Each element scene takes one of three data formats; single value, one-dimensional sequence, and two-dimensional sequence. For example, element scenes E3B1 and E3B4 are element scenes each constituted by a single parameter value. E3B2 is constituted by a one-dimensional sequence having 8 element. E3B3 is an element scene having two-dimensional sequence.

One element scene is made up of several parameter values (or parameter scenes) corresponding to its data format. The components of the same type have always the same element configuration (including the sequence), so that the sequences of the element sequences in the corresponding C scenes are the same. However, with the components of the same type, the number of elements in the one dimensional sequence or two-dimensional sequence of an element scene vary in accordance with the set parameters, thereby sometimes changing the data length of the element scene. The number of elements in the case where an element scene is a one-dimensional sequence or two-dimensional sequence is stored in the property (FIG. 3(*b*)) of the corresponding C data.

Referring to FIG. 3 again, the data structure in the PC 130 will be described continued below.

FIG. 3(*c*) shows a configuration in the RAM of the CF data to be processed by the mixer control program 131 of the PC 130. The current memory arranged in the RAM of the PC 130 has an area for storing the entire CF data (namely, CF header, CAD data for PC, and a plurality of scene data), an area for storing a current scene, which is scene data currently being set, and an engine CAD data forming buffer. On the basis of the CAD data for PC in the current memory, the configuration screen shown in FIG. 2(*a*) is displayed. The result of editing executed through the configuration screen is reflected onto the CAD data for PC in the current memory. Each current scene represents the parameter current values of each component of the displayed configuration. The result of editing executed on the parameters of the component through the parameter setting screen is reflected onto the current scene. The configuration of the current scene is the same as described with reference to FIG. 4. The engine CAD data forming buffer generates engine CAD data from the CAD data for PC when the CF data is compiled.

As described, the user can create and edit CF data in the current memory shown in FIG. 3(*c*) by use of the component data shown in FIG. 3(*a*) by executing necessary operations on the screen shown in FIG. 2 by executing the mixer control program 131 of the PC 130 and store the created and edited CF data in the configuration shown in FIG. 3(*b*). As described, the CF file stored in the PC 130 is compiled and the complied file is transferred to the engine 100 to be stored in the flash memory 102. On the engine 100, the use can specify the CF file stored in the flash memory 102 by operating the control 108 while viewing the screen shown on the display device 107 and load the specified CF data into the current memory in the RAM 103. The engine 100 operates as a mixer having the mixer configuration defined by the CF data stored in the current memory.

Figure 5:
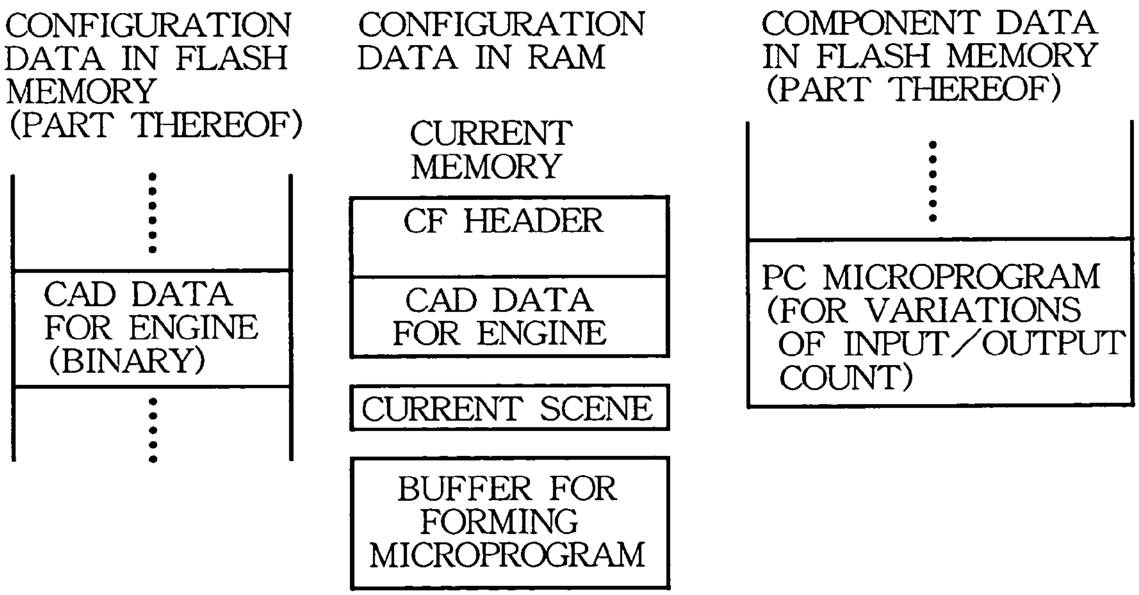
FIGS. 5(*a*), 5(*b*) and 5(*c*) are diagrams illustrating CF data (a part thereof) on the engine.

FIG. 5(*a*) shows a part of the CF data which is stored in the flash memory 102 in the engine 100. The CF data to be stored in the flash memory 102 is almost similar in configuration to the CF data in the PC shown in FIGS. 3(*b*) and 4, so that only a different part is shown in FIG. 5(*a*). Namely, on the side of the engine 100, the part of CAD data for PC shown in FIG. 3(*b*) is replaced with the engine CAD data shown in FIG. 5(*a*). The engine CAD data is the same as the CAD data for PC in that the engine CAD data is representative of the mixer configuration as shown on the configuration screen. However, inside the engine, the data such as the positions at which components and connections are shown on the screen shown in FIG. 2(*a*) is unnecessary, so that the engine CAD data is represented in binary without display data so as to reduce the data amount. The engine CAD data is generated in the engine CAD data forming buffer shown in FIG. 3(*c*) by compilation. On the side of the PC 130, the CF file is stored in a given storage device in the format shown in FIG. 3(*b*); after compilation, the CF file can also be stored in a given storage device in the format shown in FIG. 5(*a*). The CF file in the format shown in FIG. 5(*a*) is transferred to the engine 100 to be stored in the flash memory 102. It should be noted that a predetermined file system (that need not be compliant with the file system in the PC) is built in the flash memory 102 and the CF data is stored in the form of CF file in the plural.

FIG. 5(*b*) shows the configuration of the CF data in the RAM 103 in the engine 100. The current memory in the RAM 103 has an area for storing, of the CF data, CF header and engine CAD data, an area for storing a current scene, which is currently set scene data, and a microprogram forming buffer. When engine CAD data is read into the current memory, a microprogram for realizing the mixer configuration of the CAD data is automatically expanded into the microprogram forming buffer and the expanded microprogram is transferred to the signal processing block 110. This causes the DSP group of the signal processing block 110 to realize the operation of the mixer configuration of the CAD data in the current memory. Because the reading from the flash memory is executed at a higher speed than the reading from the storage device (the hard disk drive for example) of the PC, the speed of scene recall is not retarded if a plurality of scene data are not read into the current memory. Also, it is not always necessary to read the engine CAD data into the current memory; namely, the data in the flash memory may be directly used.

A current scene is the current value of the parameter of each component of the mixer configuration of the engine CAD data expanded in the current memory. When the current scene has been read into the current memory or the current scene has been changed, that current scene is automatically transferred to the signal processing block 110. The signal processing block 110 expands the received current scene into the coefficient memory of the DSP group. The DSP group of the signal processing block 110 executes the transferred microprogram by use of the coefficient in the coefficient memory, by which the signal processing block 110 realizes an operation in the mixer configuration of the CAD data in the current memory and with the parameter value of the current scene. The configuration of the current scene in the engine 100 is the same as described above with reference to FIG. 4.

FIG. 5(*c*) shows a part of the configuration of the preset component data stored in the flash memory 102 in advance. This component data is almost the same in configuration as the component data in the PC shown in FIG. 3(*a*), so that FIG. 5(*c*) shows only a different part. Namely, on the side of the engine 100, the part of the display and edit processing routine shown in FIG. 3(*a*) is replaced with the PC microprogram shown in FIG. 5(*c*). With the engine 100, the components in the configuration screen and the parameter setting screen having a plurality of controls shown in FIGS. 2(*a*) and 2(*b*) cannot be displayed, so that the display and edit routine for displaying and editing them is unnecessary. Instead, the engine 100 must form a microprogram (into the microprogram forming buffer) in accordance with the mixer configuration of the engine CAD data and send the formed microprogram to the DSP group, so that a PC microprogram corresponding to each component as shown in FIG. 5(*c*) is required. Although not shown, the PC processing routine, the PE processing routine, and the PP processing routine are the programs that process each piece of configuration information in the engine. It should be noted that the number of input/output terminals of each component depends on the parameter setting and it is supposed that the all the variations of the number of input/output terminals be stored in the microprogram in the component data.

The digital mixer system according to the present embodiment is characterized by that scenes are mutually usable between different mixer configurations. To be more specific, scene data can be transferred between different CF data under a predetermined condition. As seen from FIGS. 3 and 5, there are four locations in which scene data exist, namely, (a) a plurality of scene data in a plurality of CD files stored in the storage device of the PC 130, (b) a current scene and a plurality of scene data in the current memory of the PC 130, (c) a plurality of scene data in a plurality of CF files stored in the flash memory 102 of the engine 100, and (d) a current scene in the current memory of the engine 100, so that the scene data is transferred between any two (including the same one) of (a) through (d) in principle. It should be noted that it takes time for the CF files stored in the storage device of the PC 130 and the CF files stored in the flash memory of the engine 100 to be transferred as they are, so that, before starting the transfer, the CF files to be transferred are read into the copy memory in the RAM of the PC 130 or the engine 100 as CF data, this data is transferred, and, upon completion of the transfer, the data is read back to the storage device or the flash memory. In the present embodiment, this operation is referred to as the transfer of the data of CF files. Further, if there are two sets of PC and engine shown in FIG. 1, a situation sometimes occurs in which the scene data of the CF data under the control of one of the PCs or engines is moved to the other PC or engine. To any situation in which such scene data transfer is executed, the above-mentioned feature of the present embodiment is applicable.

In related-art mixers, it is practicable to recall the scene data included in the currently opened CF file to the current memory and store the current scene stored in the current memory into the currently opened CF file. In the present embodiment, the scene data can be recalled and stored between a CF file other than the currently opened CF file and the current memory. This is impossible with related-art mixers. The reason is as follows. Namely, CF files being different basically denote that the mixer configurations defined in these files are different. Between different mixer configurations, there is no compatibility between the scene data in the CF files. Mixer configurations being different basically denote that the configurations of the components in the CF files are different. If component configurations are different, the configurations of the component scenes corresponding to the components are different, so that there is no compatibility in general.

The transfer of scene data in the present embodiment is executed in various cases in accordance with the locations of scene data as described above. Typically, there are cases that follow:

(1) in the PC 130 or the engine 100, the scene data of one scene in one CF file is specified and the specified scene is read into the current scene. It is supposed that recall of scene include the reading of scene data from a CF file other than the currently opened CF file into the current scene;

(2) in the PC 130 or the engine 100, the scene data of one scene in one CF file is specified and the current scene is written to the storage area of the scene data of the specified CF file. It is supposed that the storage of a scene include the writing of the current scene to a CF file other than the currently opened CF file;

(3) in the PC 130 or the engine 100, one (or more) scene of one CF file or data of the read source and one (or more) scene of one CF file or data of write destination are specified to copy the scene data from the storage area specified as the read source to the storage area specified as the write destination. In this case, the CF file or CF data of read source and the CF file or CF data of the write destination may be the same; and (4) when two mixer control programs are executed on the PC 130 and their configuration screens are displayed (the currently memories are independently allocated), scene data is copied between the current scenes (or scene data) stored in the two current memories.

The transfer of component data in the present embodiment is executed in various manners depending on the locations at which scene data exist. Typically, component data is transferred in the following cases:

(1) one component scene in one piece of scene data in one CF file and one component scene in the current scene are specified to read the specified component scene in the CF file into the specified component scene of the current scene;

(2) one component scene of the current scene and one component scene of one component of one CF file are specified to write the specified component scene of the current scene to the component scene in the specified CF file; and (3) one component scene of one scene of one CF file or CF data of the read source and one component scene of on CF file or CF data of the write destination are specified to copy the component scene from the storage area of the component scene specified as the read source to the storage area of the component scene specified as the write destination.

This transfer of scene data or component data may also be applied to a general digital mixer that is incapable of reading user-selected CAD data to change mixer configurations. In this case, this digital mixer has one CF_ID and one CF_Ver corresponding to its unique mixer configuration.

Application of the present invention to the above-mentioned general digital mixer allows the following transfers of scene data and component scenes:

(1) One piece of scene data in one CF file is specified to read the specified scene data into the current scene of the above-mentioned general digital mixer;

(2) one (or more) piece of scene data in one CF file and one (or more) piece of scene data of the digital mixer concerned are specified to read the specified scene data of the CF file into the storage area of the specified scene data of the above-mentioned general digital mixer; and (3) one component scene of one piece of scene data in one CF file and one component scene of the current scene unique to the above-mentioned digital mixer are specified to read the specified component in the CF file into the component scene of the current scene.

The above-mentioned general digital mixer can write plural pieces of stored scene data to an external recording medium as scene files. Each of the scene files is attached with CF_ID and CF_Ver of the above-mentioned general digital mixer. If CF_ID and CF_Ver are attached to each of scene files stored in other digital mixers, the above-mentioned general digital mixer can read scene data or component scenes from the scene file stored in those other digital mixers by executing the same processing as the reading from the CF files shown in (1) through (3) above.

It should be noted that terms recall, store, and copy generally denote the transfer of data without changing the contents of data to be transferred; in the present embodiment, however, the recall, store, and copy of scene data generally denote the transfer with the contents of scene data changed. Because scene data is attached to the mixer configuration of CF data, scene data has different structures if the mixer configuration of the scene data read source differs from the mixer configuration of the scene data write destination.

The following describes the details of the feature of the present invention of recalling, storing, and copying scene data between different pieces of CF data. In recalling, storing, or copying scene data, it is necessary to specify both the information about the scene data of the read source and the information for identifying the write destination of the scene data. In the present embodiment, CF data is identified by CF_ID and CF_Ver shown in FIGS. 3 and 5, C data is identified by C_ID and U_ID, and a scene is identified by scene number, thereby allowing the recall, store, and copy of scene data if a predetermined conditions is satisfied between different mixer configurations.

CF_ID (configuration ID) identifies CF data (regardless whether it is in file form or in the current memory). CF_Ver (configuration version) denotes a version that is incremented every time CF data is edited, its initial value being 1.00 for example. When a given CF file is edited in the current memory and then the edited CF file is stored (as another file name or in overwrite manner), a CF header with the same CF_ID and incremented CF_Ver is attached. When CF data is newly created on the PC 130, a new CF_ID that does not overlap with the CF_ID created before in the model concerned or another model and CF_Ver having the initial value are attached to the newly created CF data. It is arranged that the PC 130 manages the value of the latest CF_ID to be attached next. It should be noted that C_ID and CF_ID can contain the ID of a device such as PC by which these data have been created, thereby preventing the incidentally matching CC_ID and CF_ID from being attached. It is also arranged that the CF_ID to be attached to the CF data to be created and edited by the vendor and the CF_ID to be attached to the CF data to be created and edited by the end user are put in different data ranges so as to prevent these CD-IDs from being overlapped each other. In the CF data range under the control of the vendor or in the CF data range under the control of the end user, CF_ID and CF_Ver are attached in the above-mentioned method. Attaching the IDs and versions as described above allows the tracing of different pieces of CF data having the same CF_ID back in editing to the CF data having the same CF_ID and CF_Ver having the initial value. Therefore, the different pieces of CF data having the same CF_ID belong to the same “line”.

C_ID (component ID) identifies each piece of PC data described with reference to FIG. 3(*a*). C_Ver (component version) is indicative of the version of that PC data. Each piece of C data of the CAD data in the CD data identifies each component by these C_ID and C_Ver.

In sequentially editing mixer configurations of CF data, U_ID (unique ID) identifies C data in that line. For example, when CF data is newly created for the first time, the value of new U_ID is attached to each piece of C data every time C data is newly added (component addition). When C data is deleted, the value of U_ID of the deleted C data becomes empty and this U_ID will be not be used in the line of the CF data concerned. If there is an empty U_ID, the value of a new U_ID is attached to the C data to be newly added. Consequently, if C data is added or deleted in the course of the editing of CF data and the CF data is stored in a given stage during the editing, it can be determined that any C data that have the matching U_ID in that line are the same C data. It should be noted that “same C data” does not mean “totally same data”. That is, even if there is a match between U_ID values, the matching C data still remain to be two different pieces of C data in two different pieces of CF data, so that, if parameter editing takes place in each piece of CF data, these pieces of CF data may differ from each other. However, the same C data assures the C data of the same type and having the same structure of the corresponding C scene (except for the number of element scene sequence elements).

In the present invention, C_ID indicative of data compatibility between component scenes is attached to thereto and the data compatibility between component scenes is checked by this C_ID. Namely, having the same C_ID means that there is data compatibility between these component scenes.

In addition, in the present embodiment, CF_ID indicative of data compatibility between scenes (including current scenes) is attached to each of the scenes and the data compatibility between scenes is checked by this CF_ID. Namely, having the same CF_ID means that there is data compatibility between these scenes.

Figure 6:
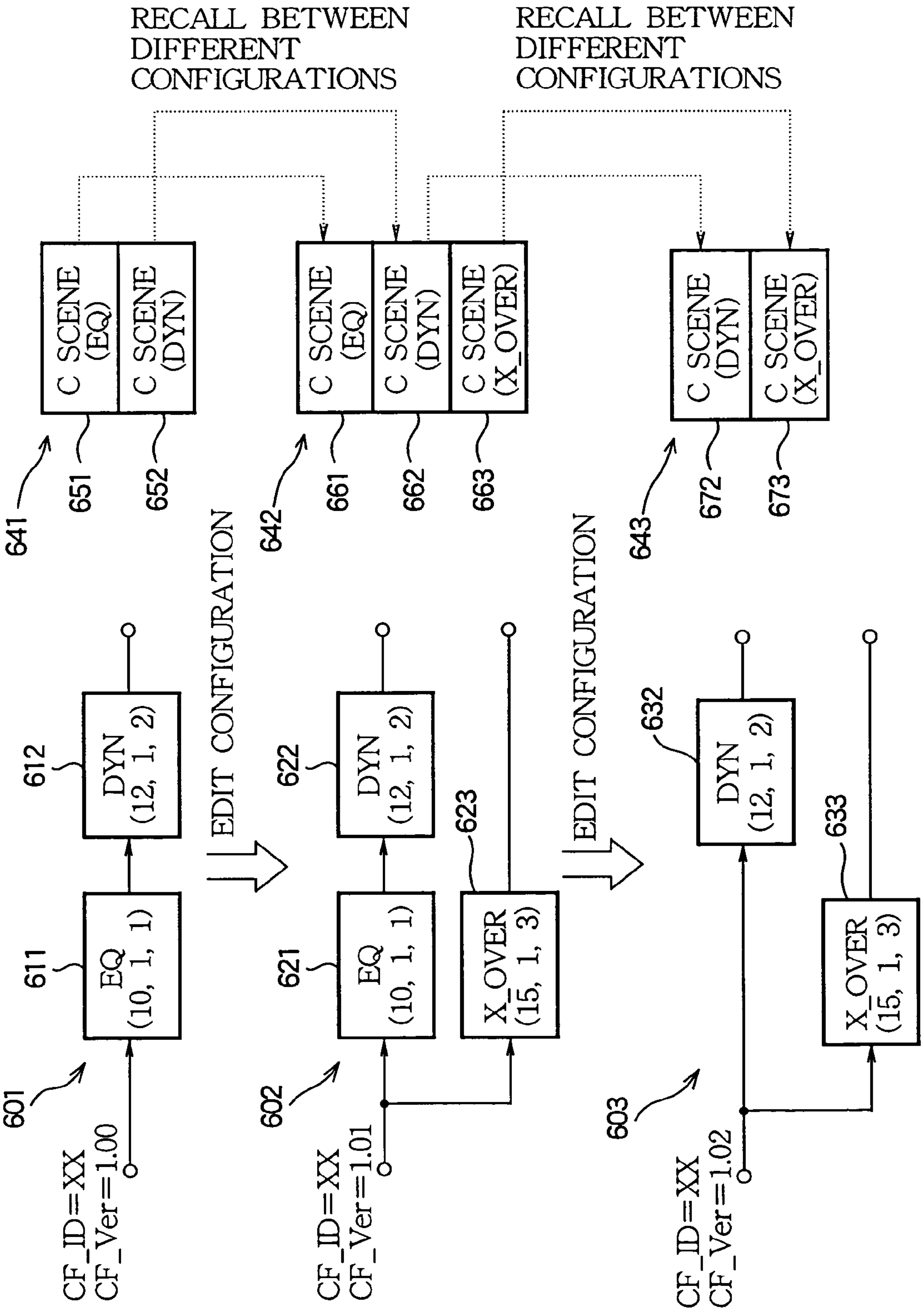
FIG. 6 is a diagram illustrating examples of configuration identification information and version information allocations in editing configuration data and a sequence data structure.

FIG. 6 shows a method of attaching ID and version in editing CF data and an exemplary configuration of scene data. Reference numeral 601 denotes CAD data newly created for the first time on the configuration screen. Because this is new creation, new CF_ID=XX is attached and CF_Ver=1.00 (initial value). This CAD data is made up of two components, an equalizer EQ 611 and a dynamics DYN 612. Three values enclosed in parentheses written in each component block denote C_ID, C_Ver, and U_ID in this order. The EQ 611 is U_ID=1 and the DYN 612 is U_ID=2.

Reference numeral 602 denotes the addition, connection, and storage as another name of a cross-over X_OVER 623, a new component, on the basis of the CF data 601. When the CF data 602 is stored, the same CF_ID=XX as the CF data 601 is attached and its version is incremented to CF_Ver=1.01. The added X_OVER 623 becomes U_ID=3. This is because, up to this point, U_IDs have been used up to U_ID=2 in this line. Reference numeral 603 denotes the deletion of the EQ 621 on the basis of the CF data 602 and the storage as another name. When the CF data 603 is stored, the same CF_ID XX as the CF data 601 and 602 is attached and the version is incremented to CF_Ver=1.02. If a component is added from the state of the CF data 603, U_ID=4 is obtained. This is because, up to this point, U_IDs have been used up to U_ID=3. The deleted U_ID=1 becomes empty and U_ID=1 will not be used any more in the edition of the CF data of this line.

Namely, the inventive mixer configuration editing apparatus is designed for use with a digital mixer having a processor capable of executing a program to constitute an audio signal processing unit having a specific mixer configuration composed of configuration components. The inventive apparatus is designed for editing mixer configuration data which defines the mixer configuration of the audio signal processing unit. The inventive mixer configuration editing apparatus has a mixer configuration data storage section that stores the mixer configuration data specified by configuration identification information CF_ID and version information CF_Ver. An editing section reads the mixer configuration data 601 specified by the configuration identification information and the version information from the mixer configuration data storage section, then edits the read mixer configuration data 601, and writes the edited mixer configuration data 602 to the mixer configuration data storage section with the same configuration identification information and updated version information. A transfer section manipulates the mixer configuration data as required and transfers the manipulated mixer configuration data to the digital mixer. The editing section includes an adding subsection that is operated as directed by a user to add a new configuration component 623 to the mixer configuration 602 and to allocate a unique identification code “3” to the new configuration component 623 such that the unique identification code “3” adheres to the added new configuration component 623 even after the version information is updated due to the editing of the mixer configuration data 602. The editing section further includes a deleting subsection that is operated as directed by the user for deleting an existing configuration component 621 from the mixer configuration 602. The editing section also includes a connecting subsection that is operated as directed by the user for setting connections among the configuration components included in the mixer configuration. The adding subsection allocates a new unique identification code “3” to the new configuration component 623, such that the new unique identification code “3” is selected from a code which has never been used in the mixer configuration data specified by the same configuration identification information. The deleting subsection abolishes the unique identification code “1” allocated to the deleted existing configuration component 621 such that the abolished unique identification code “1” is never used for a new configuration component in the mixer configuration data specified by the same configuration identification information. The editing section may includes a changing subsection that is operated as directed by the user for changing at least one of the configuration components included in the mixer configuration to a configuration component of the same type but a different scale as said one of the configuration components while maintaining the unique identification code allocated to said one of the configuration components.

Reference numeral 641 denotes one piece of sequence data (it is supposed that this sequence data be already stored with a specific sequence number) created for the CF data 601. In accordance with the two component alignments of the CF data 601, a C scene 651 corresponding to the EQ 611 and a C scene 652 corresponding to the DYN 612 are arranged.

Reference numeral 642 denotes the scene data of the CF data 602. In editing the scene data 642, specifying the scene data 641 of the CF data 601 to direct recall copies the C scenes 651 and 652 of the scene data 641 to C scenes 661 and 662 of the scene data 642. Because it is executed between the CF data 601 and the CF data 602, this recall is a recall between different configurations. In the case of the recall between different configurations, mixer configurations are different in general, so that scene data structures are different accordingly. Therefore, if the C scene 651 has been read for example, it is generally not known to which location of the scene data 642 this C scene is to be written. With the mixer system according to the present embodiment, the same CF_ID is attached to the CAD data before editing and the CAD data stored with another name after editing and, if the CF data are in the same line, the correlation between the components can be provided by means of U_ID. Consequently, after confirmation that the CF_IDs of the CF data of recall source and the CF data of recall destination match each other, that U_ID of the EQ 611 that is a component of the C scene 651 read from the scene data 641 for example is 1 is obtained, that the component with U_ID=1 is the EQ 621 is obtained from the CF data 602, and that the storage location of the C scene corresponding to the EQ 621 is 661 is obtained, thereby copying the C scene 651 to the obtained location 661. When the scene data 641 is recalled to the scene data 642, a C scene 663 of the scene data 642 is left unchanged because there is no C scene corresponding to the recall source.

In editing the scene data 643 of the CF data 603, the same as above holds when the scene data 642 of the CF data 602 is specified to direct recall. C scenes 662 and 663 of the scene data 642 are copied to C scenes 672 and 673 of the scene data 642 respectively. The recall processing sequence also attempts to copy the C scene 661 of the scene data 642 but, because U_ID of the component corresponding to this C scene is 1 and there is no component with U_ID=1 in the CF data 603 of the recall destination, the C scene 661 will not be copied. Thus, the recall between different configurations is realized.

Figures 7A, 7B, 7C:
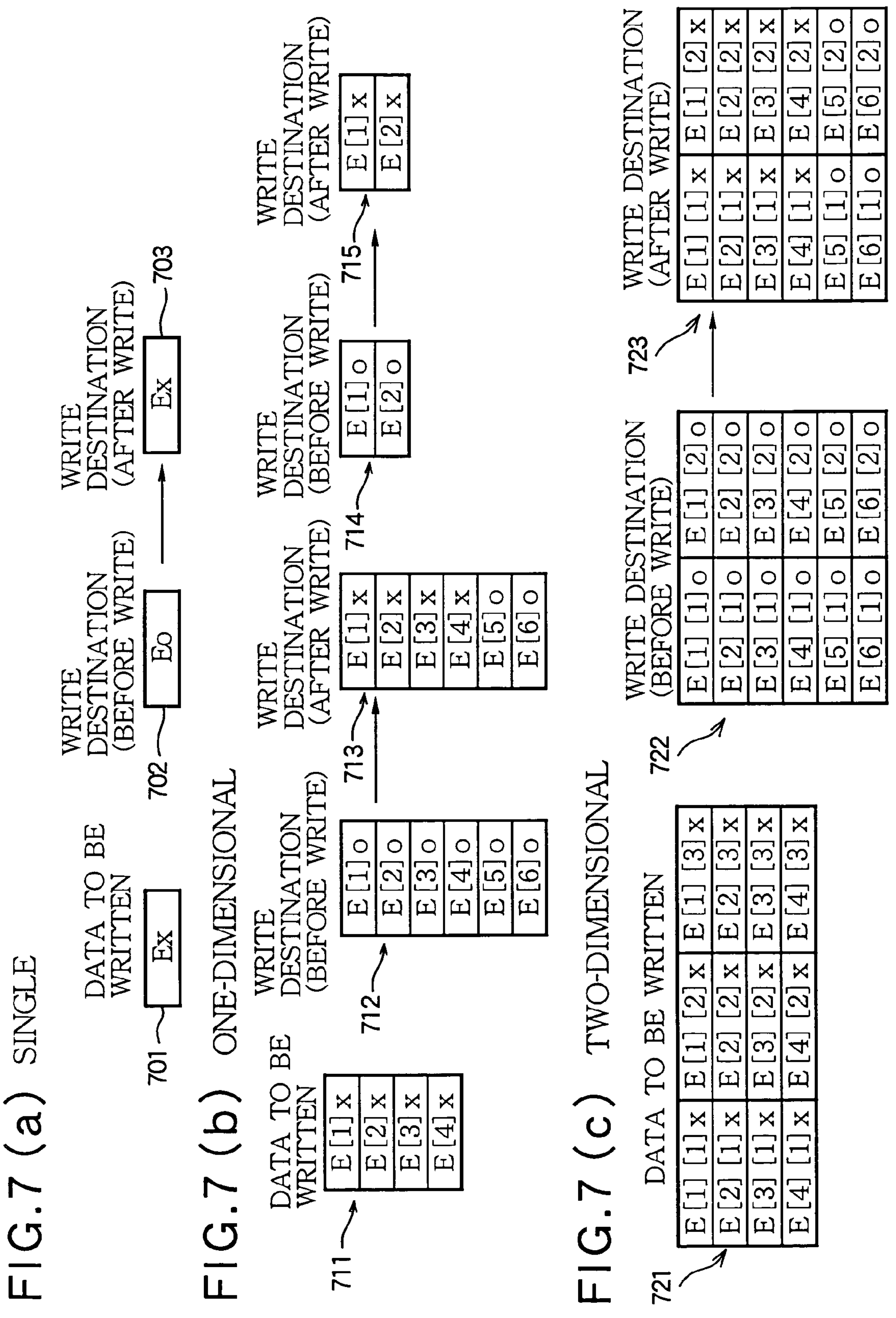
FIGS. 7(*a*), 7(*b*) and 7(*c*) are diagrams illustrating an example of element scene write processing.

FIG. 7 shows an example of element scene write processing. As described with reference to FIG. 6, with the mixer system according to the present embodiment, the correlation of C scenes can be provided by means of U_ID if there is a match between CF_IDs even between different pieces of CF data. Because the components having the same U_ID are attached with the same C_ID, there is basically mutual parameter compatibility. In some cases, the two components may differ from each other in C_Ver or the property information indicative of a component scale such as the number of terminals. Therefore, if the C scene 651 of the CF data 601 shown in FIG. 6 is copied to the C scene 661 of the CF data 602 for example, these two C scene 651 and C661 match each other in structure, namely the sequence and format of element scene sequence (single value, one-dimensional sequence, or two-dimensional sequence), but a part of the elements scenes may exist only in one of the C scenes or these C scenes may differ from each other in the number of sequence elements. Whether each C scene has elements or not is controlled by the PC configuration information of each component and the number of elements of each C scene is controlled by the property information of the C data corresponding to the CAD data. If the number of elements has been changed, a parameter scene write rule must be determined beforehand.

FIG. 7(*a*) shows an example in which an element scene is composed of a single value. Reference numeral 701 denotes data Ex to be written and reference numeral 702 denotes data Eo of write destination. When element scene write processing has been executed, the data of write destination is rewritten to Ex.

FIG. 7(*b*) shows an example in which the data format of an element scene is one-dimensional sequence. Reference numeral 711 denotes the data of element scene to be written. This data has 4 elements. If the number of elements of an element scene 712 of write destination is 6, executing the write processing rewrites the first through fourth elements of the element scene of write destination from data E[1]x to E[4]x as shown with reference numeral 713. E[5]x and E[6]o, which are here from the beginning, remain unchanged. On the other hand, if the number of elements of an element scene 714 of write destination is 2, 2 elements are rewritten as shown in reference numeral 715, E[3]x and E[4]x being ignored.

FIG. 7(*c*) shows an example in which the data format of an element scene is two-dimensional sequence. Data 721 of an element scene to be written has 4 row elements and 3 column elements. An element scene 722 of write destination has 6 row elements and 2 column elements. When the write processing is executed, only an overlapping part is rewritten with other parts ignored as shown with reference numeral 723.

As described, if an element scene is a sequence, any elements having a matching element subscript at both write source and write destination are rewritten, any elements having a subscript found only at write source are ignored, and any elements having a subscript found only at write destination are left unchanged.

Figure 8:
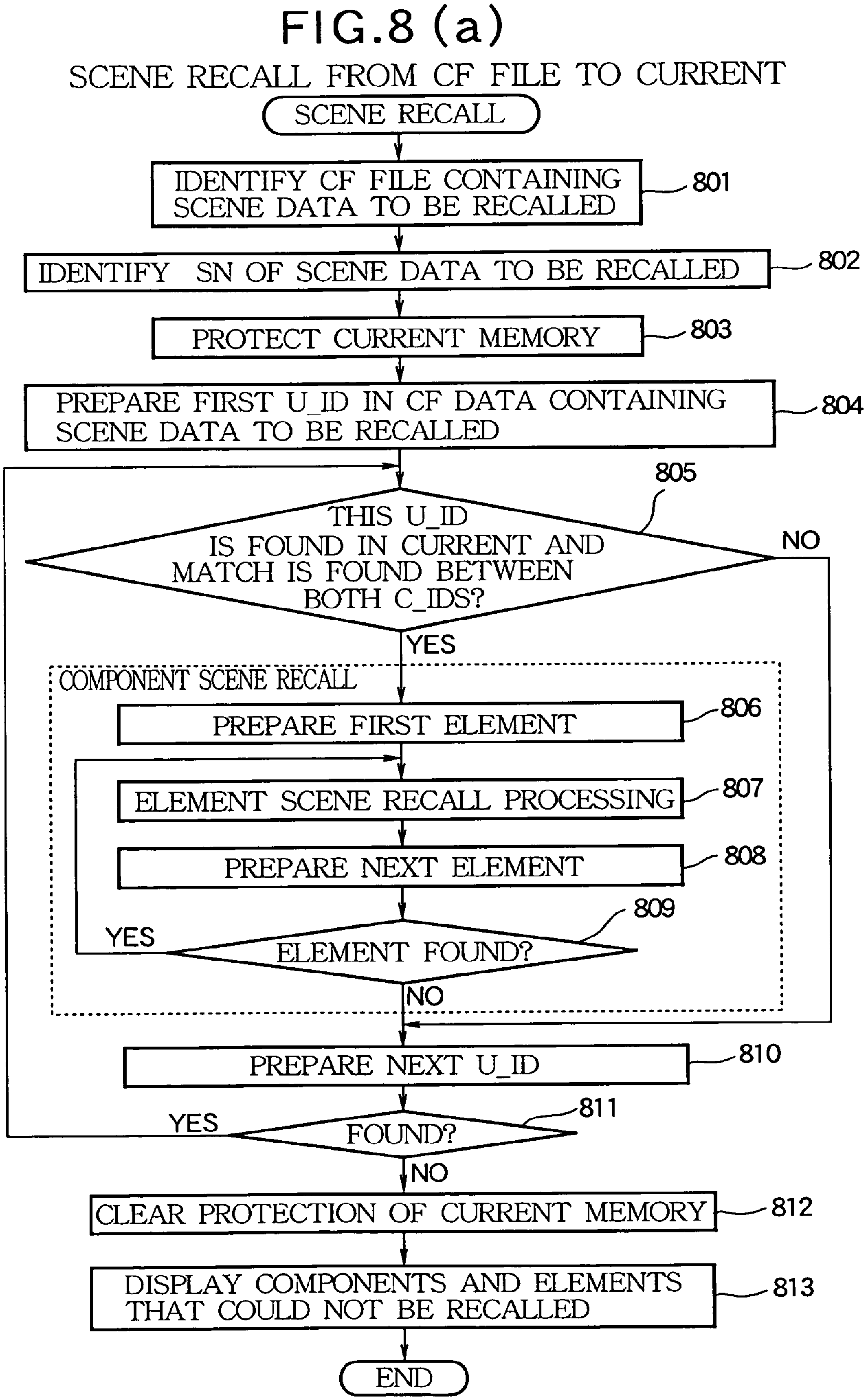
FIGS. 8(*a*) and 8(*b*) are flowcharts indicative of scene recall processing and scene store processing, respectively.
Figure 8:
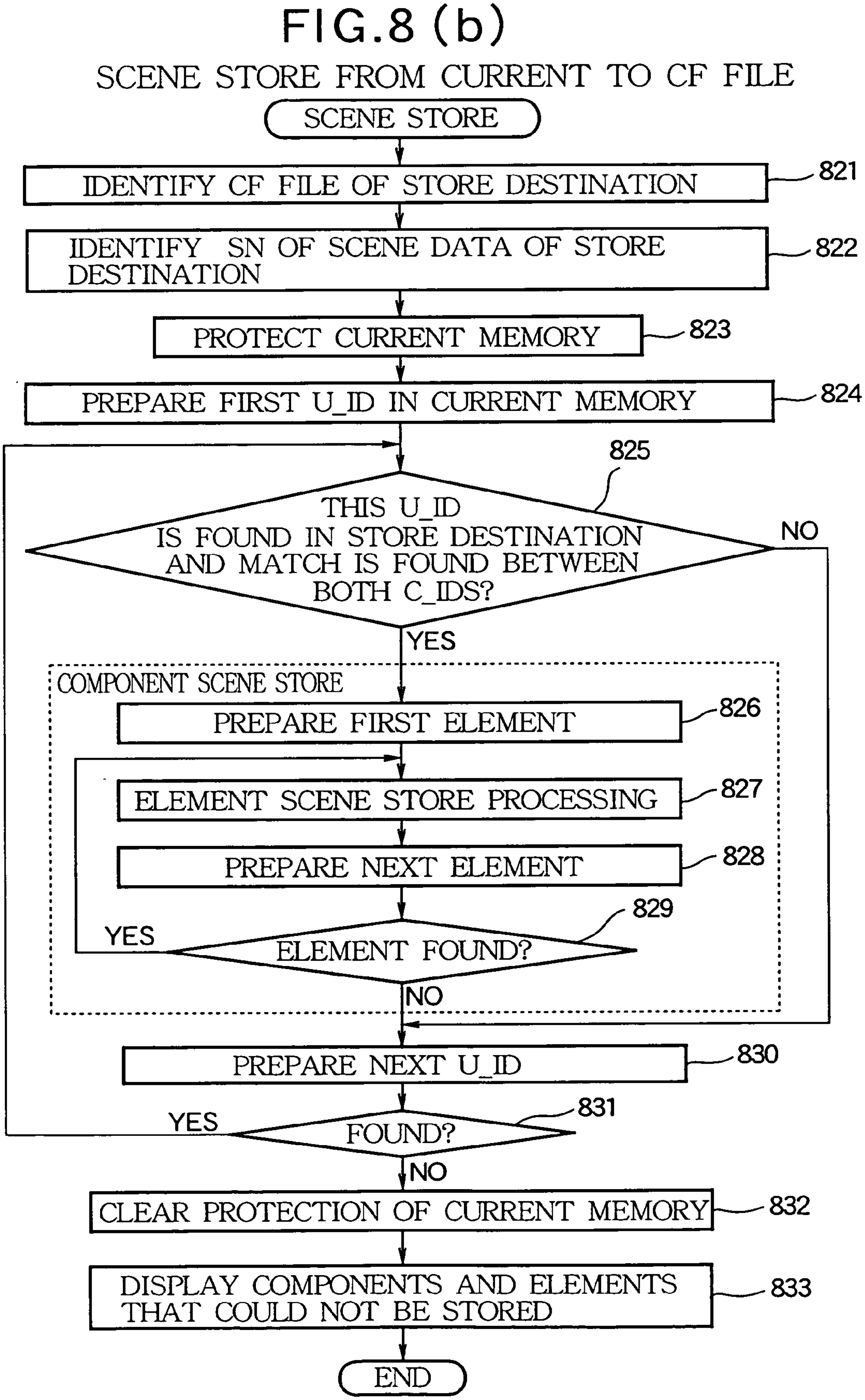

FIG. 8(*a*) shows the flow of scene recall processing from one of plural pieces of CF file scene data to a current scene. This flow corresponds to (1) of the above-mentioned typical cases in which scene data is transferred, the processing of copying scene data from a CF file to the current memory being basically the same. It should be noted that the processing of recalling scene data from the currently opened CF file can also be executed along this processing flow, requiring no additional routine.

In step 801, a CF file having a scene data to be recalled is identified. In step 802, scene number SN of the scene data to be recalled in the identified CF file is identified. These identification operations can be made in any manner. For example, in accordance with a direction of recalling a scene data of another CF file by the user, a window for identifying the scene data is displayed, in which the CF files in the specified folder are displayed as options. A desired CF file is selected from the options and the scene number of the desired scene data in that CF file is specified. In this operation, CF_IDs of all CF files in the specified holder are read and only the CF file with that CF_ID matching the CF_ID of the CF data in the current memory is displayed as an option. Consequently, the scene data to be recalled is always specified from the CF data having the matching CF_ID.

Next, in step 803, the current memory is protected to disable the rewriting by another process. In step 804, the CAD data of the CF file having the scene data to be recalled is read to prepare its first U_ID (the first number in ascending order). In step 805, it is determined whether there is a component having U_ID matching the prepared U_ID and the C_ID of the component whose U_ID matches in the CAD data in the current memory matches the C_ID of the component corresponding to the prepared U_ID in the CAD data of the CF file. If there is no component with its U_ID matching the prepared U_ID or, if any, there is no match between the C_IDs of the components, then the C scene of the component having the U_ID need not be recalled, upon which the procedure goes to step 810. If there is a component having that U_ID and there is a match between the C_IDs of the components, then the processing of steps 806 through 809 for recalling the C scene of the component having the U_ID is executed.

The processing of steps 806 through 809 corresponds to the element scene write processing described above with reference to FIG. 7. First, in step 806, the first element of the C scene is prepared. In step 807, the element scene is recalled (FIG. 7). In step 808, a next element scene is prepared. If there is any element to be recalled, the procedure returns from step 809 to step 807 to continue the processing. When all U_IDs in the CF data of recall source have been processed, then the procedure goes from step 811 to 812 to clear the protection of the current memory. In step 813, the components and elements that could not be recalled are displayed, upon which the processing ends.

FIG. 8(*b*) show the flow of scene store processing for storing the current scene into one of the plural pieces of scene data of a CF file. This processing corresponds to (2) of the above-mentioned typical cases in which scene data is transferred. The processing of copying scene data from the current memory to a CF file is basically the same. It should be noted that the processing of recalling scene data from the currently opened CF file can also be executed along this processing flow, requiring no additional routine.

In steps 821 and 822, the CF_ID and scene number SN of store destination are identified. This identification may be made in the same manner as steps 801 and 802. Only the CF files matching the CF_ID of the CF data in the current memory are displayed as options, making the CF file to be specified as store destination have the same CF_ID as the current scene. The processing of steps 823 through 833 is the same as the recall processing of steps 803 through 813. In the recall processing, the scene data of the specified CF file is copied to the current memory, while, in the store processing, data is copied from the current scene to the scene data of the specified CF file. In step 833, the components and elements that could not be stored are displayed.

FIGS. 8(*a*) and 8(*b*) show current scene recall processing and current scene store processing, so that the scene data for one scene is copied. In the same procedure, the above-mentioned typical cases (1) through (3) for scene data transfer can execute the processing of copying the scene data for two or more scenes between CF data or CF files in a batch manner.

In the processing shown in FIG. 8, the CF data having the matching CF_ID are displayed as options, from which scene data recall source or store destination are specified, thereby assuring a match between the CF_ID of the CF data of scene data transfer source and the CF_ID of the CF data of scene data transfer destination; it is also practicable to specify given CF data as options and execute CF_ID matching check at the start portion of each process. If a CF_ID mismatch is found, it is regarded that there is no compatibility and handled as an error.

Figure 9:
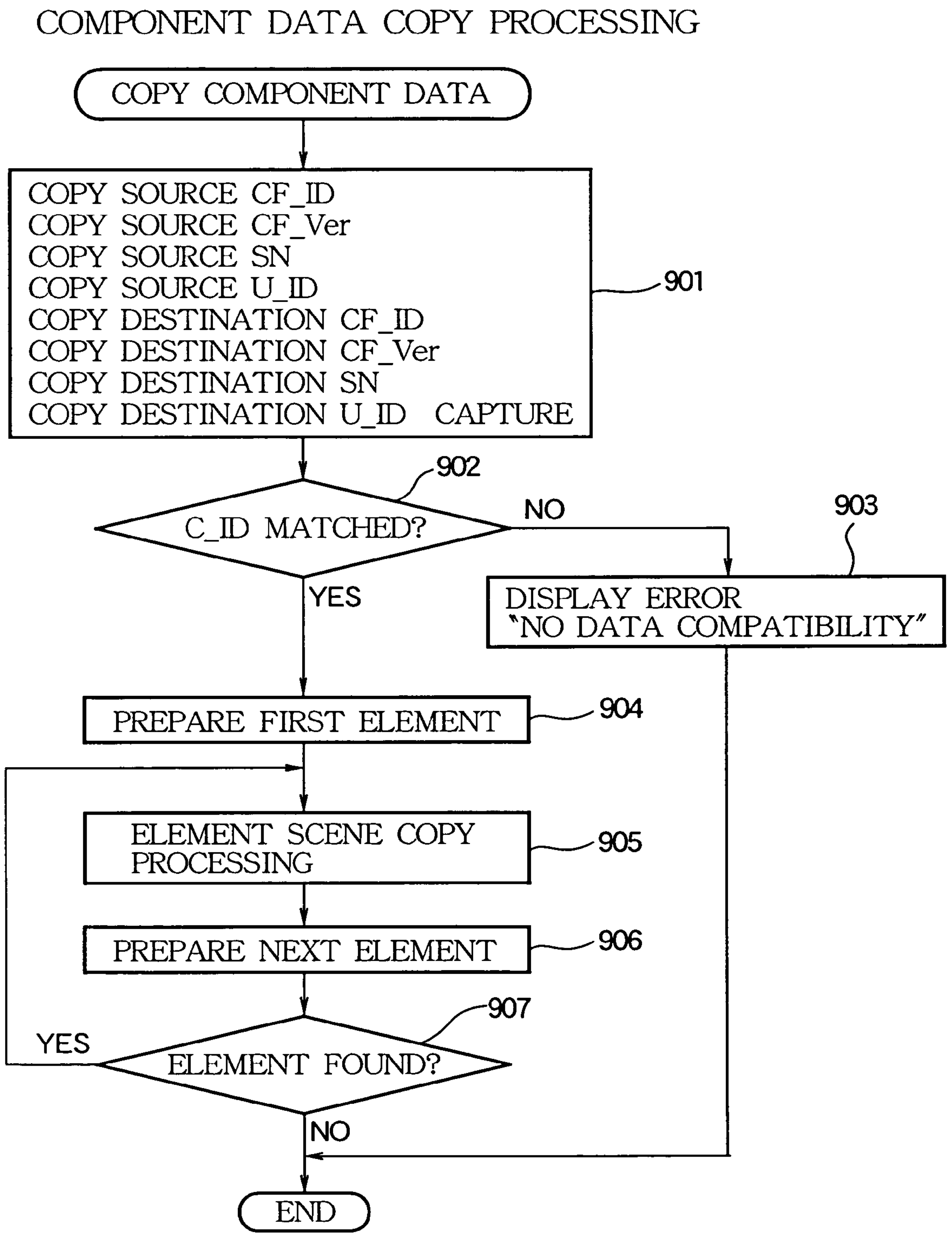
FIGS. 9(*a*) and 9(*b*) are flowcharts indicative of component data copy processing and element scene write processing, respectively.
Figure 9:
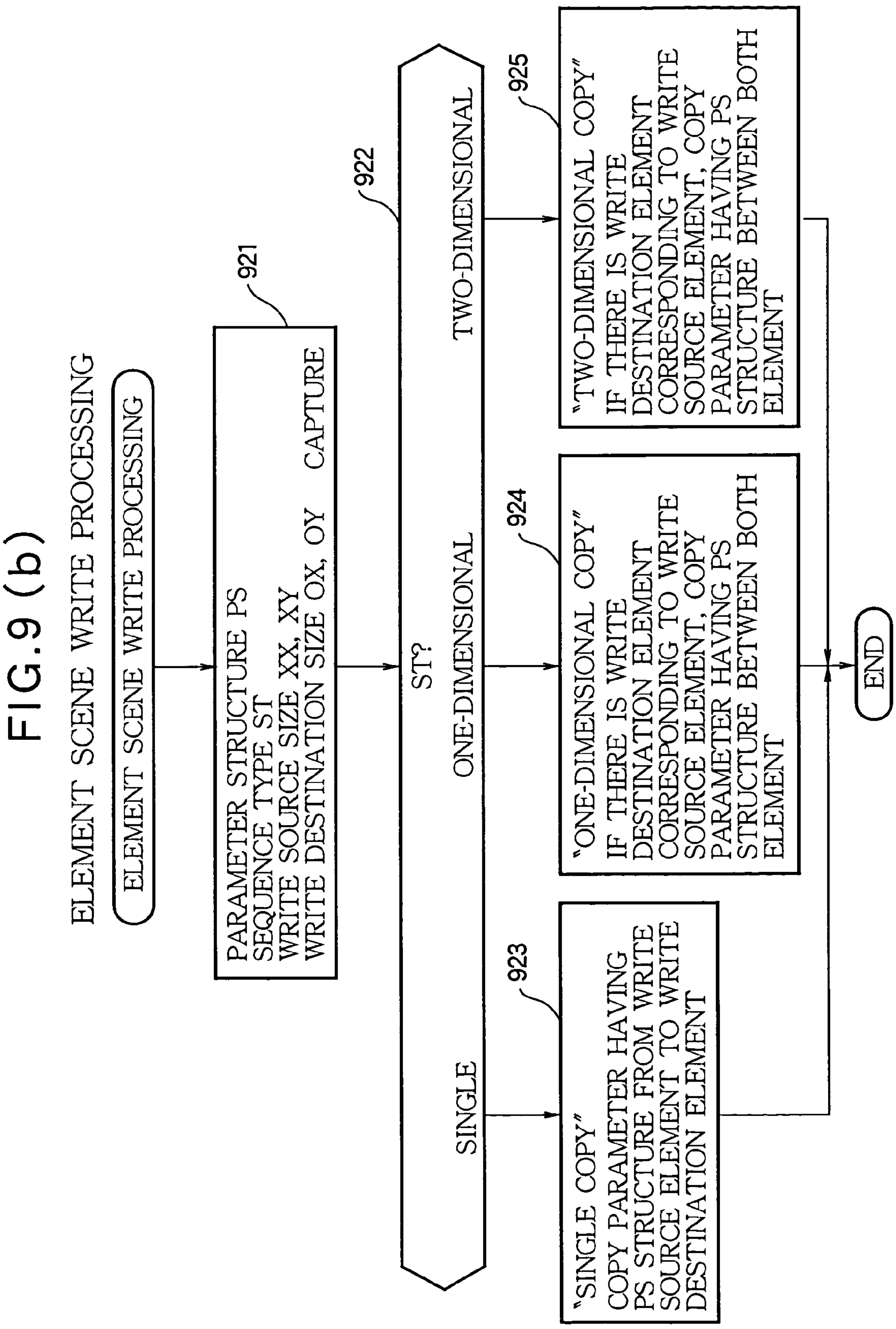

FIG. 9(*a*) shows a flow of C scene copy processing for copying a component scene (or a C scene) between two CF files. This flow corresponds to (3) of the above-mentioned typical cases in which a component scene is transferred. The processing of copying a C scene between a CF file and the current memory is basically the same. It should be noted that the processing in which a C scene is copied between different components in the same CF file and a C scene is copied between different scene data for the same component in the same CF file can also be executed along this flow and therefore there is no need to prepare another routine. In addition, the element scene recall processing of step 807 shown in FIG. 8(*a*) and the element store processing of step 872 shown in FIG. 8(*b*) are also executed in the same manner and therefore can be processed by the same routines.

In step 901, CF_ID, CF_Ver, scene number SN, and U_ID indicative of a component scene specified by the user as copy source and CF_ID, CF_Ver, scene number SN, and U_ID indicative of a component scene specified by the user as copy destination are captured (if copy source or copy destination is a current scene, SN is unnecessary). At set of CF_ID, CF_Ver, SN, and U_ID identifies one component scene of one piece of scene data of one CF file. These may be specified in any manner. For example, a window is displayed in which the component scene of copy source is identified in accordance with the direction by the user for component scene copy and the CF file, scene number, and component of copy source are specified and another window is displayed in which the component scene of copy destination is identified and the CF file, scene number, and component of copy destination are specified. In step 902, the C_ID of the component of the component scene specified as copy source is compared with the C_ID of the component of the component scene specified as copy destination. If a match is found, the element scene is copied in steps 904 through 907. The processing of steps 904 through 907 is the same as the processing of steps 806 through 809 shown in FIG. 8(*a*) and the processing of steps 826 through 829 shown in FIG. 8(*b*). In the recall processing shown in FIG. 8(*a*) and the store processing shown in FIG. 8(*b*), scene data is transferred between a CF file and the current memory. In the copy processing shown in FIG. 9(*a*), a component scene identified by the U_ID of the scene data having scene number NS of the CF data identified by the CF_ID and CF_Ver of copy source is copied to the location of the component scene identified by the U_ID of scene data having scene number SN of the CF data identified by the CF_ID and CF_Ver of copy destination. If a mismatch is found between both C_IDs in step 902, then an error is displayed indicative of incompatibility in data between the component scenes of copy source and copy destination in step 903, upon which the processing ends. It should be noted that, in the window for identifying component scene of copy destination, only the component among the components of the CF file selected as copy destination that has the same C_ID as the C_ID of the component already specified as copy destination may be displayed. In this case, because both C_IDs have already been confirmed to be the same, the processing of step 902 can be skipped.

Namely, the inventive method is designed for editing a component scene of a digital mixer having a processor capable of executing a program to constitute an audio signal processing unit composed of a plurality of components. The component scene is a parameter set for use in operation of each component of the audio signal processing unit. The inventive method is carried out by steps of storing a first storage with a first component scene which is a parameter set for use in operation of a first component identified by first component identification information and first property information, the first component scene having a first data arrangement according to the first property information of the first component, editing contents of the first component scene stored in the first storage, storing a second storage with a second component scene which is a parameter set for use in operation of a second component identified by second component identification information and second property information, the second component scene having a second data arrangement according to the second property information of the second component, reading the second component scene from the second storage if a match is found at step 902 between the second component identification information corresponding to the second component scene and the first component identification information corresponding to the first component scene, and writing at least a part of the data arrangement of the read second component scene which is common to the data arrangement of the first component scene into the first storage.

FIG. 9(*b*) shows a flow of element scene write processing which uses an access means or access routine for specifying data arrangement of scene data. This processing is the same as the processing described above with reference to FIG. 7, which is executed in steps 807, 827, and 905. In step 921 which provides the access means or access routine, parameter structure PS, sequence type ST, size of write source, and size of write destination are captured for the element scenes of write source and write destination. Parameter structure PS and sequence type ST are included in the PE configuration information of the component to which elements of write source or write destination belong and are captured by referencing the PC data of the component concerned. Sizes XX and XY of write source and sizes OX and OY of write destination are indicative of the number of sequences if the sequence type is one-dimensional or two-dimensional. These sizes are included in the property information of the C data of that component in the CAD data. In step 922, the sequence type ST is determined. If the sequence type is found to be a single parameter value, (FIG. 7(*a*)), then this single parameter value is copied in step 923. This is processing for copying a set of parameters having the data structure indicated by the parameter structure PS from the element scene of write source to the element scene of write destination. If the sequence type ST is one-dimensional (FIG. 7(*b*)), then one-dimensional sequence copy is executed in step 924. In this processing, a set of parameters having the data structure indicated by the parameter structure PS is copied from the element scene of write source to the element scene of write destination in the manner described with reference to FIG. 7(*b*) on the basis of the number of elements of write source indicated by XX and the number of elements of write destination indicated by OX. If the sequence type SP is two-dimensional (FIG. 7(*c*)), two-dimensional sequence copy is executed in step 925. In this processing, a set of parameters having the data structure indicated by the parameter structure PS is copied from the element scene of write source to the element scene of write destination in the manner described with reference to FIG. 7(*c*) on the basis of the number of row elements and the number of column elements of write source indicated by XX and XY and the number of row elements and the number of column elements of write destination indicated by OX and OY.

Namely, according to the invention, the scene data editing apparatus is designed for use in a digital mixer having a processor capable of executing a program to constitute an audio signal processing unit having a mixer configuration specified by configuration identification information and version information. The inventive apparatus is provided for editing scene data which is a parameter set for use in operation of the audio signal processing unit. The inventive scene data editing apparatus has a mixer configuration data storage section that stores a plurality of mixer configuration data including first mixer configuration data defining a first mixer configuration specified by first configuration identification information and first version information, and second mixer configuration data defining a second mixer configuration specified by second configuration identification information and second version information, a first scene data storage section that stores first scene data which is a parameter set of the first mixer configuration specified by the first configuration identification information and the first version information for use in operation of the audio signal processing unit of the first mixer configuration. In the inventive step, a first access section 921 specifies an arrangement of data elements of each parameter of the first scene data based on the first mixer configuration, and is operated to access the first scene data storage section for reading and writing of the first scene data. A parameter editing section reads the first scene data stored in the first scene data storage section by use of the first access section 921 for editing contents of the first scene data. A second scene data storage section stores second scene data which is a parameter set for use in the second mixer configuration specified by the second configuration identification information and the second version information. A second access section 921 specifies an arrangement of data elements of each parameter of the second scene data based on the second mixer configuration, and is operated to access the second scene data storage section for reading and writing of the second scene data. A copy section 923, 924 or 925 performs copying of each parameter between the first scene data stored in the first scene data storage section and the second scene data stored in the second scene data storage section by use of the first access section and the second access section if a match is found between the first configuration identification information and the second configuration identification information, such that the copying is effected only a portion of the data elements of each parameter overlapped between the first scene data and the second scene data.

The above-mentioned embodiment is applicable to any programmable or non-programmable mixer engines. In addition, giving the same configuration ID to the upper digital mixer and the lower digital mixer that are different from each other in the number of input channels, the number of output channels, and the number of mixing buses for example allows the mutual use of scenes between these two digital mixers. Further, configuring a digital mixer with two or more components and allocating a component ID to each of these components allow the mutual use of component scenes between the components having the same component ID.

What is claimed is:

1. A digital mixer apparatus having a processor capable of executing a program to constitute an audio signal processing unit, the program corresponding to a first mixer configuration specified by both of first configuration identification information and first version information and realizing operation of the audio signal processing unit having the first mixer configuration, the digital mixer apparatus comprising:

a first storage section that stores first scene data which is a data set of parameters for use in the operation of the audio signal processing unit having the first mixer configuration specified by the first configuration identification information and the first version information;

a parameter editing section that edits contents of the first scene data stored in the first storage section;

a parameter supply section that reads the first scene data from the first storage section and supplies the first scene data to the audio signal processing unit;

a second storage section that stores second scene data which is a data set of parameters for use in operation of an audio signal processing unit having second mixer configuration which is specified by second configuration identification information and second version information; and a copy section that can perform copying of the second scene data to the first scene data provided that a match is found between the first configuration identification information and the second configuration identification information even if the first version information and the second version information are different, by reading the second scene data from the second storage section and writing at least a part of the read second scene data which corresponds to a portion common to both of the first mixer configuration and the second mixer configuration into the first storage section.

2. The digital mixer apparatus according to claim 1, wherein the first mixer configuration specified by the first configuration identification information and the first version information is composed of configuration components identified by respective unique identification codes, and the second mixer configuration specified by the second configuration identification information and the second version information is composed of configuration components identified by respective unique identification codes, and wherein the copy section determines the portion common to both of the first mixer configuration and the second mixer configuration in accordance with the unique identification codes allotted to the configuration components common to both of the first mixer configuration and the second mixer configuration.

3. A scene data editing apparatus for use with a digital mixer having a processor capable of executing a program to constitute an audio signal processing unit, the apparatus being provided for editing scene data which is a data set of parameters for use in operation of the audio signal processing unit, the scene data editing apparatus comprising:

a first storage section that stores first scene data which is a data set of parameters for use in the operation of the audio signal processing unit having a first mixer configuration specified by first configuration identification information and first version information;

an editing section that edits contents of the first scene data stored in the first storage section;

a second storage section that stores second scene data which is a data set of parameters for use in the operation of the audio signal processing unit having a second mixer configuration specified by second configuration identification information and second version information; and a copy section that can perform copying of the second scene data to the first scene data provided that a match is found between the first configuration identification information and the second configuration identification information even if the first version information and the second version information are different, by reading the second scene data from the second storage section and writing at least a part of the read second scene data which corresponds to a portion common to both of the first mixer configuration and the second mixer configuration into the first storage section.

4. The scene data editing apparatus according to claim 3, wherein the first mixer configuration specified by the first configuration identification information and the first version information is composed of configuration components identified by respective unique identification codes, and the second mixer configuration specified by the second configuration identification information and the second version information is composed of configuration components identified by respective unique identification codes, and wherein the copy section determines the portion common to both of the first mixer configuration and the second mixer configuration according to the unique identification codes allotted to the configuration components common to both of the first mixer configuration and the second mixer configuration.

5. A digital mixer system comprising a processor capable of executing a program to constitute an audio signal processing unit, and a scene data editing apparatus for editing scene data which is a data set of parameters for use in operation of the audio signal processing unit, wherein the scene data editing apparatus comprises:

a first storage section that stores first scene data which is a data set of parameters for use in the operation of the audio signal processing unit having a first mixer configuration specified by first configuration identification information and first version information;

an editing section that edits contents of the first scene data stored in the first storage section;

a second storage section that stores second scene data which is a data set of parameters for use in the operation of the audio signal processing unit having a second mixer configuration specified by second configuration identification information and second version information; and a copy section that can perform copying of the second scene data to the first scene data provided that a match is found between the first configuration identification information and the second configuration identification information even if the first version information and the second version information are different, by reading the second scene data from the second storage section and writing at least a part of the read second scene data which corresponds to a portion common to both of the first mixer configuration and the second mixer configuration into the first storage section.

6. A mixer configuration editing apparatus for use with a digital mixer having a processor capable of executing a program to constitute an audio signal processing unit having a specific mixer configuration, the apparatus being provided for editing mixer configuration data which represents the mixer configuration and which contains scene data representative of a data set of parameters for use in operation of the audio signal processing unit of the specific mixer configuration, the mixer configuration editing apparatus comprising:

a first storage section that stores first scene data which is a data set of parameters for use in the operation of the audio signal processing unit having a first mixer configuration specified by first configuration identification information and first version information;

an editing section that edits contents of the first scene data stored in the first storage section;

a second storage section that stores second scene data which is a data set of parameters for use in the operation of the audio signal processing unit having a second mixer configuration specified by second configuration identification information and second version information; and a copy section that can perform copying of the second scene data to the first scene data provided that a match is found between the first configuration identification information and the second configuration identification information even if the first version information and the second version information are different, by reading the second scene data from the second storage section and writing at least a part of the read second scene data which corresponds to a portion common to both of the first mixer configuration and the second mixer configuration into the first storage section.

7. A mixer configuration editing apparatus for use with a digital mixer having a processor capable of executing a program to constitute an audio signal processing unit having a specific mixer configuration composed of configuration components, the apparatus being designed for editing mixer configuration data which defines the mixer configuration of the audio signal processing unit, the mixer configuration editing apparatus comprising:

a mixer configuration data storage section that stores the mixer configuration data specified by configuration identification information and version information;

an editing section that reads the mixer configuration data specified by the configuration identification information and the version information from the mixer configuration data storage section, then edits the read mixer configuration data, and writes the edited mixer configuration data to the mixer configuration data storage section with the same configuration identification information and updated version information; and a transfer section that manipulates the mixer configuration data as required and transfers the manipulated mixer configuration data to the digital mixer, wherein the editing section includes:

an adding subsection that is operated as directed by a user to add a new configuration component to the mixer configuration and to allocate a unique identification code to the new configuration component such that the unique identification code adheres to the added new configuration component even after the version information is updated due to the editing of the mixer configuration data;

a deleting subsection that is operated as directed by the user for deleting an existing configuration component from the mixer configuration; and a connecting subsection that is operated as directed by the user for setting connections among the configuration components included in the mixer configuration.

8. The mixer configuration editing apparatus according to claim 7, wherein the adding subsection allocates a new unique identification code to the new configuration component, such that the new unique identification code is selected from a code which has never been used in the mixer configuration data specified by the same configuration identification information, and the deleting subsection abolishes the unique identification code allocated to the deleted existing configuration component such that the abolished unique identification code is never used for a new configuration component in the mixer configuration data specified by the same configuration identification information.

9. The mixer configuration editing apparatus according to claim 8, wherein the editing section further includes a changing subsection that is operated as directed by the user for changing at least one of the configuration components included in the mixer configuration to a configuration component of the same type but a different scale as said one of the configuration components while maintaining the unique identification code allocated to said one of the configuration components.

10. A scene data editing apparatus for use with a digital mixer having a processor capable of executing a program to constitute an audio signal processing unit having a mixer configuration composed of one or more configuration components each specified by a unique identification code, the scene data editing apparatus comprising:

a first storage section that stores first scene data which is a data set of parameters for use in operation of the audio signal processing unit of a first mixer configuration specified by first configuration identification information;

an editing section that edits contents of the first scene data stored in the first storage section;

a second storage section that stores second scene data which is a data set of parameters for use in operation of the audio signal processing unit of a second mixer configuration specified by second configuration identification information; and a copy section that can perform copying of the second scene data to the first scene data provided that a match is found between the first configuration identification information and the second configuration identification information, by reading the second scene data from the second storage section and writing at least a part of the read second scene data which corresponds to a common configuration component having the same unique identification code and being contained in both of the first mixer configuration and the second mixer configuration.

11. A digital mixer apparatus having a processor capable of executing a program to constitute an audio signal processing unit having a mixer configuration specified by configuration identification information, the digital mixer apparatus comprising:

a mixer configuration data storage section that stores a plurality of mixer configuration data including first mixer configuration data defining a first mixer configuration specified by first configuration identification information and first version information, and second mixer configuration data defining a second mixer configuration specified by second configuration identification information and second version information;

a program supply section that generates the program on the basis of the first mixer configuration data identified by the first configuration identification information and the first version information and that supplies the generated program to the processor to constitute the audio signal processing unit of the first mixer configuration;

a first scene data storage section that stores first scene data which is a parameter set of the first mixer configuration specified by the first configuration identification information and the first version information for use in operation of the audio signal processing unit of the first mixer configuration;

a first access section that specifies an arrangement of data elements of each parameter of the first scene data based on the first mixer configuration and that is operated to access the first scene data storage section for reading and writing of the first scene data;

a parameter editing section that reads the first scene data stored in the first scene data storage section by use of the first access section for editing contents of the first scene data;

a parameter supply section that reads the first scene data from the first scene data storage section by use of the first access section for supplying the first scene data to the audio signal processing unit;

a second scene data storage section that stores second scene data which is a parameter set for use in the second mixer configuration identified by the second configuration identification information and the second version information;

a second access section that specifies an arrangement of data elements of each parameter of the second scene data based on the second mixer configuration and that is operated to access the second scene data storage section for reading and writing of the second scene data; and a copy section that performs copying of each parameter between the first scene data stored in the first scene data storage section and the second scene data stored in the second scene data storage section by use of the first access section and the second access section if a match is found between the first configuration identification information and the second configuration identification information, such that the copying is effected only a portion of the data elements of each parameter overlapped between the first scene data and the second scene data.

12. A scene data editing apparatus for use in a digital mixer having a processor capable of executing a program to constitute an audio signal processing unit having a mixer configuration specified by configuration identification information and version information, the apparatus being provided for editing scene data which is a parameter set for use in operation of the audio signal processing unit, the scene data editing apparatus comprising:

a mixer configuration data storage section that stores a plurality of mixer configuration data including first mixer configuration data defining a first mixer configuration specified by first configuration identification information and first version information, and second mixer configuration data defining a second mixer configuration specified by second configuration identification information and second version information;

a first scene data storage section that stores first scene data which is a parameter set of the first mixer configuration specified by the first configuration identification information and the first version information for use in operation of the audio signal processing unit of the first mixer configuration;

a first access section that specifies an arrangement of data elements of each parameter of the first scene data based on the first mixer configuration and that is operated to access the first scene data storage section for reading and writing of the first scene data;

a parameter editing section that reads the first scene data stored in the first scene data storage section by use of the first access section for editing contents of the first scene data;

a second scene data storage section that stores second scene data which is a parameter set for use in the second mixer configuration specified by the second configuration identification information and the second version information;

a second access section that specifies an arrangement of data elements of each parameter of the second scene data based on the second mixer configuration and that is operated to access the second scene data storage section for reading and writing of the second scene data; and a copy section that performs copying of each parameter between the first scene data stored in the first scene data storage section and the second scene data stored in the second scene data storage section by use of the first access section and the second access section if a match is found between the first configuration identification information and the second configuration identification information, such that the copying is effected only a portion of the data elements of each parameter overlapped between the first scene data and the second scene data.

13. A scene data storage apparatus for use in a digital mixer having a processor capable of executing a program to constitute an audio signal processing unit having a mixer configuration specified by configuration identification information and version information, the apparatus being provided for storing scene data which is a parameter set for use in operation of the audio signal processing unit, the scene data storage apparatus comprising:

a mixer configuration data storage section that stores mixer configuration data defining the mixer configuration specified by the configuration identification information and the version information;

a scene data storage section that stores the scene data which is a parameter set for use in operation of the audio signal processing unit having the mixer configuration specified by the configuration identification information and the version information;

an access section that specifies an arrangement of data elements of each parameter of the scene data based on the mixer configuration data and that is operated to access the scene data storage section for reading and writing of the scene data; and a writing section that writes data elements of each parameter of given scene data into the scene data storage section, such that among a plurality of data elements of each parameter of the scene data to be written, only data elements contained in the arrangement of the data elements specified by the access section is actually written into the scene data storage section.

14. A digital mixer apparatus having a processor capable of executing a program to constitute an audio signal processing unit, the program corresponding to a mixer configuration composed of a plurality of components identified by respective component identification information and being executed by the processor to realize operation of the mixer configuration, the digital mixer apparatus comprising:

a first storage section that stores scene data which is a data set of parameters for use in operation of the audio signal processing unit having the mixer configuration composed of the plurality of the components, the scene data including a plurality of component scenes corresponding to the plurality of the components;

an editing section that edits contents of the scene data stored in the first storage section;

a first designating section that designates, as a copy destination, one of the plurality of the component scenes stored in the first storage section;

a second storage section that stores a plurality of component scenes for use in operation of corresponding components each identified by the component identification information;

a second designating section that designates, as a copy source, one of the plurality of the component scenes stored in the second storage section; and a copy section that copies the component scene from the copy source to the copy destination if a match is found between the component identification information of the component corresponding to the copy source and the component identification information of the component corresponding to the copy destination, wherein the copy section determines that the components identified by the same component identification information have data compatibility between the corresponding component scenes containing a plurality of data elements, and that copies only a part of data elements common to both of the data elements of the copy source and the data elements of the copy destination.

15. A parameter editing apparatus for use in a digital mixer having a processor capable of executing a program to constitute an audio signal processing unit composed of a plurality of components, the apparatus being provided for editing a component scene which is a parameter set for use in operation of each component of the audio signal processing unit, the parameter editing apparatus comprising:

a first storage section that stores a first component scene which is a parameter set for use in operation of a first component identified by first component identification information and first property information, the first component scene having a first data arrangement according to the first property information of the first component;

an editing section that edits contents of the first component scene stored in the first storage section;

a second storage section that stores a second component scene which is a parameter set for use in operation of a second component identified by second component identification information and second property information, the second component scene having a second data arrangement according to the second property information of the second component; and a copy section that reads the second component scene from the second storage section if a match is found between the second component identification information corresponding to the second component scene and the first component identification information corresponding to the first component scene, and that writes at least a part of the data arrangement of the read second component scene which is common to the data arrangement of the first component scene into the first storage section.

16. A digital mixer system comprising a processor capable of executing a program to constitute an audio signal processing unit composed of a plurality of components, and a parameter editing apparatus for editing a component scene which is a parameter set for use in operation of each component of the audio signal processing unit, wherein the parameter editing apparatus comprises:

a first storage section that stores a first component scene which is a parameter set for use in operation of a first component identified by first component identification information and first property information, the first component scene having a first data arrangement according to the first property information of the first component;

an editing section that edits contents of the first component scene stored in the first storage section;

a second storage section that stores a second component scene which is a parameter set for use in operation of a second component identified by second component identification information and second property information, the second component scene having a second data arrangement according to the second property information of the second component; and a copy section that reads the second component scene from the second storage section if a match is found between the second component identification information corresponding to the second component scene and the first component identification information corresponding to the first component scene, and that writes at least a part of the data arrangement of the read second component scene which is common to the data arrangement of the first component scene into the first storage section.

17. A mixer configuration editing apparatus for use in a digital mixer having a processor capable of executing a program to constitute an audio signal processing unit having a specific mixer configuration composed of a plurality of components, the apparatus being provided for editing the mixer configuration containing a component scene which is a parameter set for use in operation of each component of the mixer configuration, the mixer configuration editing apparatus comprising:

a first storage section that stores a first component scene which is a parameter set for use in operation of a first component identified by first component identification information and first property information, the first component scene having a first data arrangement according to the first property information of the first component;

an editing section that edits contents of the first component scene stored in the first storage section;

a second storage section that stores a second component scene which is a parameter set for use in operation of a second component identified by second component identification information and second property information, the second component scene having a second data arrangement according to the second property information of the second component; and a copy section that reads the second component scene from the second storage section if a match is found between the second component identification information corresponding to the second component scene and the first component identification information corresponding to the first component scene, and that writes at least a part of the data arrangement of the read second component scene which is common to the data arrangement of the first component scene into the first storage section.

18. A method of editing scene data for a digital mixer having a processor capable of executing a program to constitute an audio signal processing unit, the scene data being a data set of parameters for use in operation of the audio signal processing unit, the method comprising the steps of:

storing a first storage with first scene data which is a data set of parameters for use in the operation of the audio signal processing unit having a first mixer configuration specified by first configuration identification information and first version information;

editing contents of the first scene data stored in the first storage;

storing a second storage with second scene data which is a data set of parameters for use in the operation of the, audio signal processing unit having a second mixer configuration specified by second configuration identification information and second version information; and performing copy of the second scene data to the first scene data provided that a match is found between the first configuration identification information and the second configuration identification information even if the first version information and the second version information are different, by reading the second scene data from the second storage and writing at least a part of the read second scene data which corresponds to a portion common to both of the first mixer configuration and the second mixer configuration into the first storage.

19. A method of editing scene data for a digital mixer having a processor capable of executing a program to constitute an audio signal processing unit having a mixer configuration composed of one or more configuration components each specified by a unique identification code, the method comprising the steps of:

storing a first storage with first scene data which is a data set of parameters for use in operation of the audio signal processing unit of a first mixer configuration specified by first configuration identification information;

editing contents of the first scene data stored in the first storage;

storing a second storage with second scene data which is a data set of parameters for use in operation of the audio signal processing unit of a second mixer configuration specified by second configuration identification information; and performing copy of the second scene data to the first scene data provided that a match is found between the first configuration identification information and the second configuration identification information, by reading the second scene data from the second storage and writing at least a part of the read second scene data which corresponds to a common configuration component having the same unique identification code and being contained in both of the first mixer configuration and the second mixer configuration.

20. A method of editing mixer configuration data for a digital mixer having a processor capable of executing a program to constitute an audio signal processing unit having a specific mixer configuration composed of configuration components, the mixer configuration data defining the mixer configuration of the audio signal processing unit, the method comprising the steps of:

storing a mixer configuration data storage with the mixer configuration data specified by configuration identification information and version information;

reading the mixer configuration data specified by the configuration identification information and the version information from the mixer configuration data storage;

editing the read mixer configuration data;

writing the edited mixer configuration data to the mixer configuration data storage with the same configuration identification information and updated version information; and manipulating the mixer configuration data as required and transferring the manipulated mixer configuration data to the digital mixer, wherein the editing step includes:

adding as directed by a user a new configuration component to the mixer configuration and allocating a unique identification code to the new configuration component such that the unique identification code adheres to the added new configuration component even after the version information is updated due to the editing of the mixer configuration data;

deleting as directed by the user an existing configuration component from the mixer configuration; and setting connections as directed by the user for setting connections among the configuration components included in the mixer configuration.

21. A method of editing scene data for a digital mixer having a processor capable of executing a program to constitute an audio signal processing unit having a mixer configuration specified by configuration identification information and version information, the scene data being a parameter set for use in operation of the audio signal processing unit, the method comprising:

a storing step of storing a mixer configuration data storage with a plurality of mixer configuration data including first mixer configuration data defining a first mixer configuration specified by first configuration identification information and first version information, and second mixer configuration data defining a second mixer configuration specified by second configuration identification information and second version information;

a first storing step of storing a first scene data storage with first scene data which is a parameter set of the first mixer configuration specified by the first configuration identification information and the first version information for use in operation of the audio signal processing unit of the first mixer configuration;

a first access step of specifying an arrangement of data elements of each parameter of the first scene data based on the first mixer configuration and accessing the first scene data storage for reading and writing of the first scene data;

a parameter editing step of reading the first scene data stored in the first scene data storage by use of the first access step for editing contents of the first scene data;

a second storage step of storing a second scene data storage with second scene data which is a parameter set for use in the second mixer configuration specified by the second configuration identification information and the second version information;

a second access step of specifying an arrangement of data elements of each parameter of the second scene data based on the second mixer configuration and accessing the second scene data storage for reading and writing of the second scene data; and a copy step of performing copy of each parameter between the first scene data stored in the first scene data storage and the second scene data stored in the second scene data storage by use of the first access step and the second access step if a match is found between the first configuration identification information and the second configuration identification information, such that the copy step is effected only a portion of the data elements of each parameter overlapped between the first scene data and the second scene data.

22. A method of editing a component scene for a digital mixer having a processor capable of executing a program to constitute an audio signal processing unit composed of a plurality of components, the component scene being a parameter set for use in operation of each component of the audio signal processing unit, the method comprising the steps of:

storing a first storage with a first component scene which is a parameter set for use in operation of a first component identified by first component identification information and first property information, the first component scene having a first data arrangement according to the first property information of the first component;

editing section that edits contents of the first component scene stored in the first storage;

storing a second storage with a second component scene which is a parameter set for use in operation of a second component identified by second component identification information and second property information, the second component scene having a second data arrangement according to the second property information of the second component;

reading the second component scene from the second storage if a match is found between the second component identification information corresponding to the second component scene and the first component identification information corresponding to the first component scene; and writing at least a part of the data arrangement of the read second component scene which is common to the data arrangement of the first component scene into the first storage.

23. A computer-readable storage medium storing program code for performing a method of editing scene data for a digital mixer having a processor capable of executing a program to constitute an audio signal processing unit, the scene data being a data set of parameters for use in operation of the audio signal processing unit, wherein the method comprises the steps of:

storing a first storage with first scene data which is a data set of parameters for use in the operation of the audio signal processing unit having a first mixer configuration specified by first configuration identification information and first version information;

editing contents of the first scene data stored in the first storage;

storing a second storage with second scene data which is a data set of parameters for use in the operation of the audio signal processing unit having a second mixer configuration specified by second configuration identification information and second version information; and performing copy of the second scene data to the first scene data provided that a match is found between the first configuration identification information and the second configuration identification information even if the first version information and the second version information are different, by reading the second scene data from the second storage and writing at least a part of the read second scene data which corresponds to a portion common to both of the first mixer configuration and the second mixer configuration into the first storage.

24. A computer-readable storage medium storing program code for performing a method of editing scene data for a digital mixer having a processor capable of executing a program to constitute an audio signal processing unit having a mixer configuration composed of one or more configuration components each specified by a unique identification code, wherein the method comprises the steps of:

storing a first storage with first scene data which is a data set of parameters for use in operation of the audio signal processing unit of a first mixer configuration specified by first configuration identification information;

editing contents of the first scene data stored in the first storage;

storing a second storage with second scene data which is a data set of parameters for use in operation of the audio signal processing unit of a second mixer configuration specified by second configuration identification information; and performing copy of the second scene data to the first scene data provided that a match is found between the first configuration identification information and the second configuration identification information, by reading the second scene data from the second storage and writing at least a part of the read second scene data which corresponds to a common configuration component having the same unique identification code and being contained in both of the first mixer configuration and the second mixer configuration.

25. A computer-readable storage medium storing program code for performing a method of editing mixer configuration data for a digital mixer having a processor capable of executing a program to constitute an audio signal processing unit having a specific mixer configuration composed of configuration components, the mixer configuration data defining the mixer configuration of the audio signal processing unit, wherein the method comprises the steps of:

storing a mixer configuration data storage with the mixer configuration data specified by configuration identification information and version information;

reading the mixer configuration data specified by the configuration identification information and the version information from the mixer configuration data storage;

editing the read mixer configuration data;

writing the edited mixer configuration data to the mixer configuration data storage with the same configuration identification information and updated version information; and manipulating the mixer configuration data as required and transferring the manipulated mixer configuration data to the digital mixer, wherein the editing step includes:

adding as directed by a user a new configuration component to the mixer configuration and allocating a unique identification code to the new configuration component such that the unique identification code adheres to the added new configuration component even after the version information is updated due to the editing of the mixer configuration data;

deleting as directed by the user an existing configuration component from the mixer configuration; and setting connections as directed by the user for setting connections among the configuration components included in the mixer configuration.

26. A computer-readable storage medium storing program code for performing a method of editing scene data for a digital mixer having a processor capable of executing a program to constitute an audio signal processing unit having a mixer configuration specified by configuration identification information and version information, the scene data being a parameter set for use in operation of the audio signal processing unit, wherein the method comprises:

a storing step of storing a mixer configuration data storage with a plurality of mixer configuration data including first mixer configuration data defining a first mixer configuration specified by first configuration identification information and first version information, and second mixer configuration data defining a second mixer configuration specified by second configuration identification information and second version information;

a first storing step of storing a first scene data storage with first scene data which is a parameter set of the first mixer configuration specified by the first configuration identification information and the first version information for use in operation of the audio signal processing unit of the first mixer configuration;

a first access step of specifying an arrangement of data elements of each parameter of the first scene data based on the first mixer configuration and accessing the first scene data storage for reading and writing of the first scene data;

a parameter editing step of reading the first scene data stored in the first scene data storage by use of the first access step for editing contents of the first scene data;

a second storage step of storing a second scene data storage with second scene data which is a parameter set for use in the second mixer configuration specified by the second configuration identification information and the second version information;

a second access step of specifying an arrangement of data elements of each parameter of the second scene data based on the second mixer configuration and accessing the second scene data storage for reading and writing of the second scene data; and a copy step of performing copy of each parameter between the first scene data stored in the first scene data storage and the second scene data stored in the second scene data storage by use of the first access step and the second access step if a match is found between the first configuration identification information and the second configuration identification information, such that the copy step is effected only a portion of the data elements of each parameter overlapped between the first scene data and the second scene data.

27. A computer-readable storage medium storing program code for performing a method of editing a component scene for a digital mixer having a processor capable of executing a program to constitute an audio signal processing unit composed of a plurality of components, the component scene being a parameter set for use in operation of each component of the audio signal processing unit, wherein the method comprises the steps of:

storing a first storage with a first component scene which is a parameter set for use in operation of a first component identified by first component identification information and first property information, the first component scene having a first data arrangement according to the first property information of the first component;

editing section that edits contents of the first component scene stored in the first storage;

storing a second storage with a second component scene which is a parameter set for use in operation of a second component identified by second component identification information and second property information, the second component scene having a second data arrangement according to the second property information of the second component;

reading the second component scene from the second storage if a match is found between the second component identification information corresponding to the second component scene and the first component identification information corresponding to the first component scene; and writing at least a part of the data arrangement of the read second component scene which is common to the data arrangement of the first component scene into the first storage.

* * * * *